(12) United States Patent
Mehta et al.

(10) Patent No.: US 7,807,769 B2
(45) Date of Patent: Oct. 5, 2010

(54) ISOTACTIC POLYPROPYLENE PRODUCED FROM SUPERCRITICAL POLYMERIZATION PROCESS

(75) Inventors: Aspy K. Mehta, Humble, TX (US); Manika Varma-Nair, Warren, NJ (US); Gabor Kiss, Hampton, NJ (US); Patrick Brant, Seabrook, TX (US); Robert P. Reynolds, Clinton, NJ (US); John W. Chu, Neshanic Station, NJ (US); Steven P. Rucker, Warren, NJ (US); Peijun Jiang, League City, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 474 days.

(21) Appl. No.: 11/961,583

(22) Filed: Dec. 20, 2007

(65) Prior Publication Data

US 2008/0214767 A1 Sep. 4, 2008

Related U.S. Application Data

(63) Continuation-in-part of application No. 10/667,585, filed on Sep. 22, 2003, now Pat. No. 7,354,979.

(60) Provisional application No. 60/412,541, filed on Sep. 20, 2002.

(51) Int. Cl.
*C08F 110/06* (2006.01)
*C08F 4/6592* (2006.01)
*C08F 2/06* (2006.01)

(52) U.S. Cl. .................. 526/351; 526/73; 526/134; 526/160

(58) Field of Classification Search .................. 526/73, 526/134, 160, 351
See application file for complete search history.

(56) References Cited

U.S. PATENT DOCUMENTS

| | | | |
|---|---|---|---|
| 2,852,501 A | 9/1958 | Richard, Jr. et al. | |
| 5,084,534 A | 1/1992 | Welborn, Jr. et al. | |
| 5,096,867 A | 3/1992 | Canich | |
| 5,326,835 A | 7/1994 | Ahvenainen et al. | |
| 5,408,017 A | 4/1995 | Turner et al. | |
| 5,756,608 A | 5/1998 | Langhauser et al. | |
| 5,969,062 A | 10/1999 | Moll et al. | |
| 6,084,041 A | 7/2000 | Andtsjö et al. | |
| 6,225,432 B1 | 5/2001 | Weng et al. | |
| 6,355,741 B1 | 3/2002 | Marechal | |
| 6,562,914 B1 | 5/2003 | Andtsjö et al. | |
| 6,635,779 B1 | 10/2003 | Ewen et al. | |
| 7,081,299 B2* | 7/2006 | Richeson .................. 428/394 |
| 7,279,536 B2 | 10/2007 | Brant et al. | |
| 2002/0013440 A1 | 1/2002 | Agarwal et al. | |
| 2004/0122191 A1 | 6/2004 | Arjunan et al. | |
| 2004/0127654 A1 | 7/2004 | Brant et al. | |
| 2004/0132935 A1* | 7/2004 | Arjunan et al. .............. 526/160 |
| 2006/0025545 A1* | 2/2006 | Brant et al. .................. 526/64 |
| 2008/0214767 A1 | 9/2008 | Mehta et al. | |
| 2009/0043048 A1* | 2/2009 | Ellul et al. .................. 525/192 |

FOREIGN PATENT DOCUMENTS

| | | |
|---|---|---|
| EP | 129 368 | 7/1989 |
| EP | 1 195 391 | 4/2002 |
| EP | 1 008 607 | 12/2003 |
| JP | 08-208535 | 8/1996 |
| JP | 1998045834 | 2/1998 |
| JP | 1998110003 | 4/1998 |
| JP | 3421202 | 6/2003 |
| WO | WO 92/14766 | 9/1992 |
| WO | WO 93/05082 | 3/1993 |
| WO | WO 93/11171 | 6/1993 |
| WO | WO 96/12744 | 5/1996 |
| WO | WO 96/34023 | 10/1996 |
| WO | WO 97/11098 | 3/1997 |
| WO | WO 97/45434 | 12/1997 |
| WO | WO 00/24613 | 10/1999 |
| WO | WO 00/12572 | 3/2000 |
| WO | WO 00/37514 | 6/2000 |
| WO | WO 01/44318 | 6/2001 |

(Continued)

OTHER PUBLICATIONS

Suzuki et al., Olefin Polymerization Using Highly Congested *ansa*-Metallocenes under High Pressure: Formation of Superhigh Molecular Weight Polyolefins, Macromolecules, 2000, vol. 33, No. 3, pp. 754-759.

(Continued)

*Primary Examiner*—Roberto Rabago

(57) ABSTRACT

This invention relates to an isotactic propylene homopolymer having:
  more than 15 and less than 100 regio defects (sum of 2,1-erythro and 2,1-threo insertions and 3,1-isomerizations) per 10,000 propylene units;
  an Mw of 35000 g/mol or more;
  a peak melting temperature of greater than 149° C.;
  an mmmm pentad fraction of 0.85 or more;
  a heat of fusion of 80 J/g or more; and
  a peak melting temperature minus peak crystallization temperature (Tmp–Tcp) of less than or equal to (0.907 times Tmp) minus 99.64 (Tmp–Tcp<(0.907×Tmp)–99.64), as measured in ° C. on the homopolymer having 0 wt % nucleating agent.

25 Claims, 1 Drawing Sheet

FOREIGN PATENT DOCUMENTS

| | | |
|---|---|---|
| WO | WO 01/46273 | 6/2001 |
| WO | WO 02/44260 | 6/2002 |
| WO | WO 02/50145 | 6/2002 |
| WO | WO 02/090399 | 11/2002 |
| WO | WO 2004/026921 | 4/2004 |
| WO | WO 2004/026923 | 4/2004 |
| WO | WO 2004/052950 | 6/2004 |

OTHER PUBLICATIONS

Schaverien et al., Ethylene Bis(2-indenyl) Zirconocenes: A New class of Diastereomeric Metallocenes for the (Co)Polymerization of α-Olefins, Organometallics, 2001, vol. 20, No. 16, pp. 3436-3452.

P. Lehmus, et al., Metallocene-PP Produced Under Supercritical Polymerization Conditions, 1st Blue Sky Conference on Catalytic Olefin Polymerization, Jun. 17-20, 2002, Sorrento, Italy, 2002.

* cited by examiner

ISOTACTIC POLYPROPYLENE PRODUCED FROM SUPERCRITICAL POLYMERIZATION PROCESS

PRIORITY CLAIM

This application is a continuation-in-part of U.S. patent application Ser. No. 10/667,585, filed on Sep. 22, 2003 now U.S. Pat. No. 7,354,979, which claims benefit of U.S. Provisional Patent Application No. 60/412,541, filed on Sep. 20, 2002.

CROSS-REFERENCE TO RELATED APPLICATIONS

This application relates to U.S. Pat. No. 7,279,536.

BACKGROUND OF THE INVENTION

1. Field of the Invention

The present invention relates to propylene homopolymers, preferably produced using a supercritical polymerization process.

2. Description of the Related Art

Since the mid-1980s metallocene catalysts have been used in high-pressure reactors-mainly for producing ethylene-backbone polymers including ethylene copolymers with monomers of one or more of propylene, butene, and hexene, along with other specialty monomers such as 4-methyl-1,5-hexadiene. For example U.S. Pat. No. 5,756,608, granted to Langhausen et al., reports a process for polymerizing C2 to C10 1-alkenes using bridged metallocene catalysts. Polypropylene production in high pressure conditions has, however, been seen as impractical and unworkable at temperatures much above the propylene critical point. A process to produce commercially useful polypropylene in a high pressure system would provide advantages, such as increased reactivity, or increased catalyst productivity, or higher throughput, or shorter residence times, etc. Likewise new polypropylene polymers are also in constant need for the preparation of new and improved products. Thus there is a need in the art to develop new processes capable of greater efficiency and manufacture of new polypropylene polymers.

U.S. Pat. No. 6,084,041, granted to Andtsjö et al., discloses supercritical propylene polymerization under relatively mild conditions (90-100° C. and less than 6.89 MPa pressure) using supported Ziegler-Natta and metallocene catalysts. This patent does not relate to propylene copolymerization at temperatures or pressures much higher than described above. It also does not specifically disclose bulk propylene polymerization using soluble, unsupported metallocene catalysts.

U.S. Pat. No. 5,969,062 granted to Mole et al., describes a process for preparing ethylene copolymers with α-olefins in which polymerization is carried out at a pressure between 100-350 MPa and at a temperature from 200-280° C. The catalyst is based on a tetramethylcyclopentadienyl titanium complex.

U.S. Pat. No. 5,408,017 describes an olefin polymerization catalyst for use at polymerization temperatures of 140° C.-160° C., or greater. Mainly, temperatures exceeding the melting point temperature and approaching the polymer decomposition temperature are said to yield high productivity.

WO 93/11171 discloses a polyolefin production process that comprises continuously feeding olefin monomer and a metallocene catalyst system into a reactor. The monomer is continuously polymerized to provide a monomer-polymer mixture. Reaction conditions keep this mixture at a pressure below the system's cloud-point pressure. These conditions create a polymer-rich and a monomer-rich phase and maintain the mixture's temperature above the polymer's melting point.

U.S. Pat. No. 6,355,741 discloses a process for producing polyolefins having a bimodal molecular weight distribution. The process comprises producing a first polyolefin fraction in a first loop reactor. The process couples this first loop reactor to a second loop reactor that prepares a second polyolefin fraction. At least one of the loops uses supercritical conditions.

WO 92/14766 describes a process comprising the steps of (a) continuously feeding olefinic monomer and a catalyst system, with a metallocene component and a cocatalyst component, to the reactor; (b) continuously polymerizing that monomer in a polymerization zone reactor under elevated pressure; (c) continuously removing the polymer/monomer mixture from the reactor; (d) continuously separating monomer from molten polymer; (e) reducing pressure to form a monomer-rich and a polymer-rich phase; and (f) separating monomer from the reactor.

U.S. Pat. No. 5,326,835 describes bimodal polyethylene production. This invention's first reactor stage is a loop reactor in which polymerization occurs in an inert, low-boiling hydrocarbon. After the loop reactor, the reaction medium transits into a gas-phase reactor where gas-phase ethylene polymerization occurs. The polymer produced appears to have a bimodal molecular weight distribution.

CA 2,118,711 (equivalent to DE 4,130,299) describes propylene polymerization at 149° C. and 1510 bar using (CH3)2C(fluorenyl)(cyclopentadienyl)zirconium dichloride complex, methylalumoxane and trimethylaluminum. Catalyst activity is reported to be 8380 gPP/g Ic' h. The Mw is reported to be 2,000. CA 2,118,711 also describes propylene polymerization with ethylene at 190° C. and 1508 bar using (CH3)2C(fluorenyl)(cyclopentadienyl)zirconium dichloride complex, methylalumoxane and trimethylaluminum. Catalyst activity is reported to be 24,358 g Polymer/g Ic' hr. The Mw is reported to be 10,000.

U.S. Pat. No. 7,279,536 discloses polypropylene polymers made at pressures around 200,000 kPa and temperatures from 109 to 175° C. using dimethyl rac-dimethylsilyl-bis-(5,6,7,8-tetrahydro-5,5,8,8-tetramethyl-2-methyl-1H-benz(f)indene) hafnium dimethyl or dimethylsilyl bis(2-methyl-4-phenylindenyl)zirconium dichloride and methylalumoxane.

Other references include "Olefin Polymerization Using Highly Congested ansa-Metallocenes under High Pressure: Formation of Superhigh Molecular Weight Polyolefins," Suzuki, et al., Macromolecules, 2000, 33, 754-759; EP 1 123 226; WO 00 12572; WO 00 37514; EP 1 195 391; U.S. Pat. No. 6,355,741; and "Ethylene Bis(Indenyl) Zirconocenes . . . ," Schaverien, C.J. et al., Organometallics, ACS, Columbus Ohio, vol. 20, no. 16, August 2001, pg 3436-3452; WO 96/34023; WO 97/11098; U.S. Pat. Nos. 5,084,534; 2,852,501; WO 93/05082; EP 129 368 B1; WO 97/45434; JP 96-208535; U.S. Pat. No. 5,096,867; WO 96/12744; U.S. Pat. Nos. 5,408,017; 5,084,534; 6,225,432; WO 02/090399; EP 1 195 391; WO 02/50145; US 2002 013440; US 2004/0122191 A1; WO 2004/026921; WO 01/46273; EP 1 008 607; JP-1998-110003A; U.S. Pat. No. 6,562,914; and JP-1998-341202B2.

An abstract obtained from the Borealis website that states, "mPP produced in bulk conditions (100% propylene), especially at elevated temperature and under supercritical conditions, shows rheological behaviour indicative for small amounts of LCB in the polymer. This is a feature that can be utilized to produce mPP with enhanced melt strength under industrially meaningful conditions. "Barbo Loefgren, E. Kokko, L. Huhtanen, M Lahelin, Petri Lehmus, Udo Stehling. "Metallocene-PP produced under supercritical conditions," 1st Blue Sky Conference on Catalytic Olefin Polymerization, 17-20/6/2002, Sorrrento, Italy, 2002.

SUMMARY OF THE INVENTION

This invention relates to an isotactic propylene homopolymer (iPP) having:
a) more than 15 and less than 100 regio defects (sum of 2,1-erythro and 2,1-threo insertions, and 3,1-isomerizations) per 10,000 propylene units;
b) a weight average molecular weight (Mw) of 35,000 g/mol or more;
c) a melting peak temperature (Tmp) of greater than 149° C.;
d) mmmm pentads fraction of 0.85 or more;
e) a heat of fusion ($\Delta$Hf) of 80 J/g or more; and
f) a melting peak temperature minus crystallization peak temperature (Tmp–Tcp, also referred to as supercooling range) of less than or equal to (0.907 times Tmp) minus 99.64 (or expressed by the formula: Tmp–Tcp<(0.907× Tmp)–99.64), as measured in degrees C. on the homopolymer having 0 wt % nucleating agent.

DEFINITIONS

Figure 1:
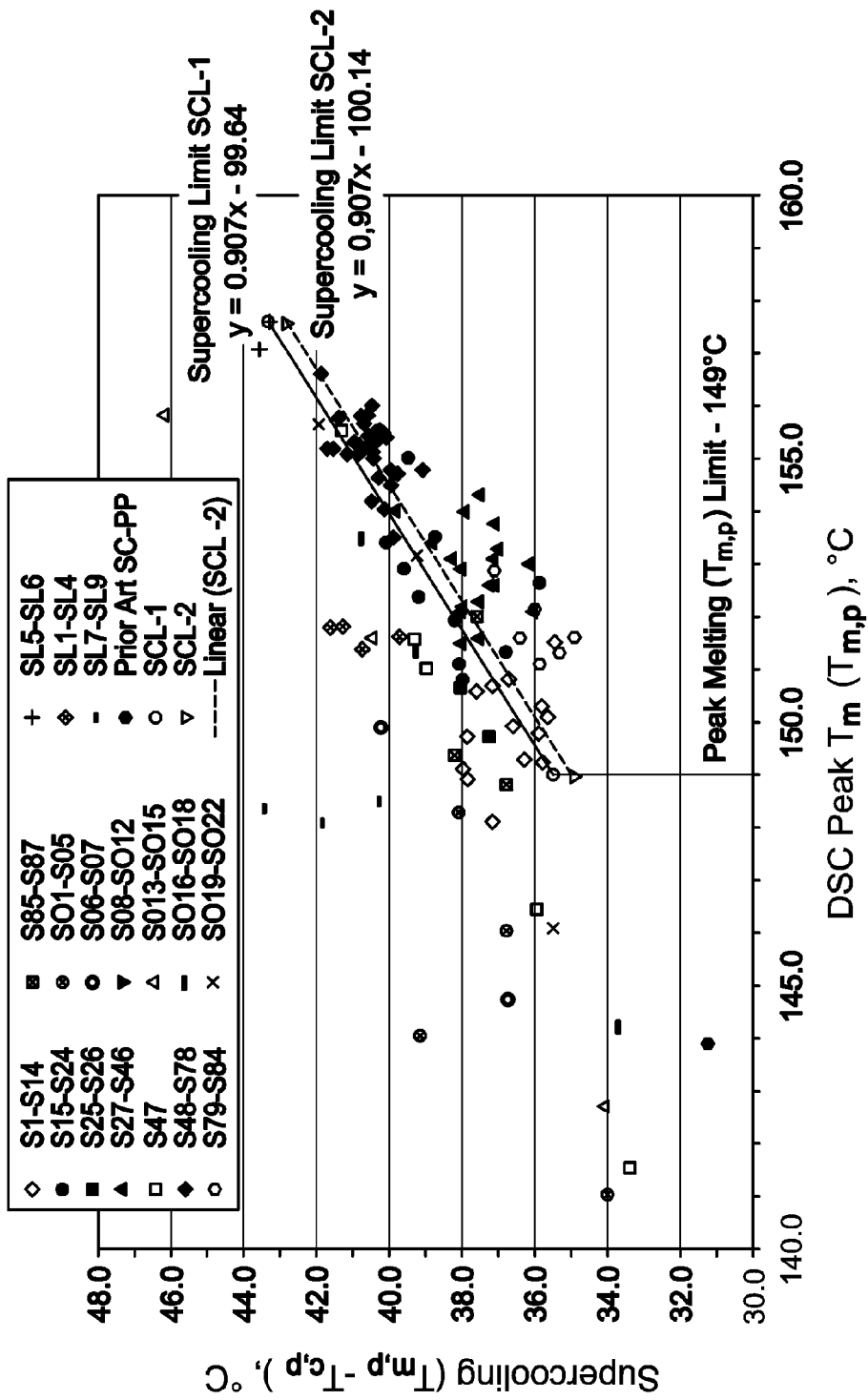
FIG. 1 graphically depicts supercooling range (Tmp–Tcp) versus peak melting temperature (Tmp) for inventive homopolypropylene various other propylene polymers.

A catalyst system is defined to be the combination of one or more catalyst compounds and one or more activators. The term "catalyst compound" is used interchangeably herein with the terms "catalyst," "catalyst precursor," and "catalyst precursor compound."

A dense fluid is a liquid or supercritical fluid having a density of at least 300 kg/m3.

The solid-fluid phase transition temperature is defined as the temperature below which a solid polymer phase separates from the homogeneous polymer-containing fluid medium at a given pressure. The solid-fluid phase transition temperature can be determined by temperature reduction at constant pressure starting from temperatures at which the polymer is fully dissolved in the fluid medium. The phase transition is observed as the system becoming turbid, when measured using the method described below for determining cloud point.

The solid-fluid phase transition pressure is defined as the pressure below which a solid polymer phase separates from the polymer-containing fluid medium at a given temperature. The solid-fluid phase transition pressure is determined by pressure reduction at constant temperature starting from pressures at which the polymer is fully dissolved in the fluid medium. The phase transition is observed as the system becoming turbid, when measured using the method described below for determining cloud point.

The fluid-fluid phase transition pressure is defined as the pressure below which two fluid phases—a polymer-rich phase and a monomer rich phase—form at a given temperature. The fluid-fluid phase transition pressure can be determined by pressure reduction at constant temperature starting from pressures at which the polymer is fully dissolved in the fluid medium. The phase transition is observed as the system becoming turbid, when measured using the method described below for determining cloud point.

The fluid-fluid phase transition temperature is defined as the temperature below which two fluid phases—a polymer-rich phase and a monomer rich phase—form at a given pressure. The fluid-fluid phase transition temperature can be determined by temperature reduction at constant pressure starting from temperatures at which the polymer is fully dissolved in the fluid medium. The phase transition is observed as the system becoming turbid, when measured using the method described below for determining cloud point.

The cloud point is the pressure below which, at a given temperature, the polymerization system becomes turbid as described in J. Vladimir Oliveira, C. Dariva and J. C. Pinto, Ind. Eng, Chem. Res. 29, 2000, 4627. For purposes of this invention and the claims thereto, the cloud point is measured by shining a helium laser through the selected polymerization system in a cloud point cell onto a photocell and recording the pressure at the onset of rapid increase in light scattering for a given temperature. Cloud point pressure is the point at which at a given temperature, the polymerization system becomes turbid. Cloud point temperature is the point at which at a given pressure, the polymerization system becomes turbid. It should be noted that although both the cloud point pressure and cloud point temperature are well-defined physical properties, in the area of polymer engineering, "cloud point" typically refers to the cloud point pressure.

A higher $\alpha$-olefin is defined to be an $\alpha$-olefin having 4 or more carbon atoms.

The use of the term "polymerization" encompasses any polymerization reaction such as homopolymerization and copolymerization. A copolymerization encompasses any polymerization reaction of two or more monomers.

The new numbering scheme for the Periodic Table Groups is used as published in Chemical and Engineering News, 63(5), 27 (1985).

When a polymer or oligomer is referred to as comprising an olefin, the olefin present in the polymer or oligomer is the polymerized or oligomerized form of the olefin. An oligomer is defined to be compositions having 2-120 monomer units. A polymer is defined to be compositions having 121 or more monomer units.

A polymerization system is defined to be monomer(s) plus comonomer(s) plus polymer(s) plus optional inert solvent(s)/diluent(s) plus optional scavenger(s). Note that for the sake of convenience and clarity, the catalyst system is always addressed separately in the present discussion from other components present in a polymerization reactor. In this regard, the polymerization system is defined here narrower than customary in the art of polymerization that typically considers the catalyst system as part of the polymerization system. In the current definition, the mixture present in the polymerization reactor and in its effluent is composed of the polymerization system plus the catalyst system.

To be in the supercritical state, a substance must have a temperature above its critical temperature (Tc) and a pressure above its critical pressure (Pc). If not measured, critical temperatures (Tc) and critical pressures (Pc) are those found in the Handbook of Chemistry and Physics, David R. Lide, Editor-in-Chief, 82nd edition 2001-2002, CRC Press, LLC. New York, 2001. In particular, the Tc and Pc of propylene are 364.9 K and 4.6 MPa. In the event a Tc and/or Pc cannot be measured for a given system, then the Tc and/or Pc will be deemed to be the Tc and/or Pc of the mole fraction weighted averages of the corresponding Tc's and Pc's of the system components.

The following abbreviations are used: Me is methyl, Ph is phenyl, Et is ethyl, Pr is propyl, iPr is isopropyl, n-Pr is normal propyl, Bu is butyl, iBu is isobutyl, tBu is tertiary butyl, p-tBu is para-tertiary butyl, TMS is trimethylsilyl, TIBA is trisobutylaluminum, MAO is methylalumoxane, pMe is para-methyl, flu is fluorenyl, cp is cyclopentadienyl, Ind is indenyl.

The term "continuous" is defined to mean a system that operates without interruption or cessation. For example a continuous process to produce a polymer would be one where the reactants are continually introduced into one or more reactors and polymer product is continually withdrawn.

A slurry polymerization means a polymerization process in which particulate, solid polymer forms in a dense fluid or in a liquid/vapor polymerization medium. The dense fluid polymerization medium can form a single or two fluid phases, such as liquid, or supercritical fluid, or liquid/liquid, or supercritical fluid/supercritical fluid polymerization medium. In the liquid/vapor polymerization medium the polymer resides in the liquid (dense fluid) phase.

A solution polymerization means a polymerization process in which the polymer is dissolved in a liquid polymerization system, such as an inert solvent or monomer(s) or their blends. A solution polymerization is typically a homogeneous liquid polymerization system.

A supercritical polymerization means a polymerization process in which the polymerization system is in a dense (i.e. its density is 300 kg/m3 or higher), supercritical state.

A bulk polymerization means a polymerization process in which a dense fluid polymerization system contains less than 40 wt % of inert solvent or diluent. The product polymer may be dissolved in the dense fluid polymerization system or may form a solid phase. In this terminology, a slurry polymerization, in which solid polymer particulates form in a dense fluid polymerization system containing less than 40 wt % of inert solvent or diluent, is referred to as a bulk slurry polymerization process or bulk heterogeneous polymerization process. A polymerization process in which the polymeric product is dissolved in a dense fluid polymerization system containing less than 40 wt % of inert solvent or diluent is referred to as bulk homogeneous polymerization process. A polymerization process in which the polymeric product is dissolved in a liquid polymerization system containing less than 40 wt % of inert solvent or diluent is referred to as bulk solution polymerization process. A polymerization process in which the polymeric product is dissolved in a supercritical polymerization system containing less than 40 wt % of inert solvent or diluent is referred to as bulk homogeneous supercritical polymerization process.

Homogeneous polymerization or a homogeneous polymerization system is a polymerization system where the polymer product is uniformly dissolved in the polymerization medium. Such systems are not turbid as described in J. Vladimir Oliveira, C. Dariva and J. C. Pinto, Ind. Eng. Chem. Res. 29, 2000, 4627. For purposes of this invention and the claims thereto, turbidity is measured by shining a helium laser through the selected polymerization system in a cloud point cell onto a photocell and determining the point of the onset of rapid increase in light scattering for a given polymerization system. Uniform dissolution in the polymerization medium is indicated when there is little or no light scattering (i.e. less than 5%)

The term "high boiling point diluent" refers to a hydrocarbon having a boiling point of 30° C. or more than the boiling point of propylene (−47.6° C. at 760 mmHg). Preferred high boiling point diluents have a boiling point of 50° C. or more, or 70° C. or more, or 100° C. or more, or 120° C. or more, or 150° C. or more than the boiling point of propylene (−47.6° C. at 760 mmHg).

For purposes of this invention and the claims thereto, a nucleating agent is defined as an organic or inorganic substance that, when added to the polypropylene described herein at a concentration in a range of 0.005 to 10 wt %, increases the crystallization temperature by at least 3° C. as determined by differential scanning calorimetry at a cooling rate of 10° C./min.

Unless otherwise noted, all molecular weights units (e.g., Mw, Mn, Mz) are g/mol and all ppm's are wt ppm.

The term solvent refers to a dense fluid having a boiling point of 30° C. or more than the boiling point of propylene at 760 mm Hg (−47.6° C. at 760 mm Hg).

DETAILED DESCRIPTION

In a preferred embodiment this invention relates to a propylene homopolymer and process for polymerizing propylene in a homogeneous polymerization system. The propylene homopolymer preferably has a weight-average molecular weight (Mw) of 35,000 g/mol or more. In one or more embodiment, the Mw can be 50,000 g/mol or more; 100,000 g/mol or more; 150,000 g/mol or more; 200,000 g/mol or more; or 500,000 g/mol or more. The propylene homopolymer preferably has an Mw ranging from about 35,000 to 1,000,000; alternately from 50,000 to 1,000,000; alternately from 75,000 to 750,000; alternately from 100,000 to 400,000. Weight average molecular weights (Mw) are determined using Gel-Permeation Chromatography (GPC), as described in more detail below.

The propylene homopolymer preferably has a peak melting point, also referred as peak melting temperature, or melting peak temperature (Tmp) of 149° C. or more, preferably 150° C. or more, alternately 151° C. or more, alternately 152° C. or more, alternately 153° C. or more, alternately 154° C. or more, alternately 155° C. or more. In one or more embodiments, the peak melting temperature can range from about 150° C. to about 170° C., alternately from 150° C. to about 165° C., alternately from 152° C. to about 160° C. Peak melting temperature (Tmp) is determined using Differential Scanning Calorimetry (DSC), as described in more detail below.

The propylene homopolymer described herein preferably has a crystallization half time (Tc-half), as measured by differential scanning calorimetry (DSC), in the absence of any nucleating agents (e.g. 0 wt %), at 126° C. of 12.0 minutes or less, preferably 12.0 to 3.9 minutes, preferably 11.5- to 3.4 minutes, preferably 11.0 to 2.9 minutes, more preferably 10.5 to 2.4 minutes.

In the current disclosure, the difference between the melting and crystallization peak temperatures (Tmp−Tcp) as measured by DSC will be also referred to as supercooling range and will be expressed in ° C. In one or more embodiments, the homopolymer described herein has a supercooling range (peak melting temperature minus peak crystallization temperature (Tmp−Tcp)) of less than or equal to (0.907 times Tmp) minus 100.14° C. (or expressed by the formula of Tmp−Tcp<(0.907×Tmp)−100.14° C.), as measured on the homopolymer having 0 wt % nucleating agent, preferably Tmp−Tcp<(0.907×Tmp)−99.64° C.

In one or more embodiments, the propylene homopolymer preferably has more than 15 and less than 100 regio defects (defined as the sum of 2,1-erythro and 2,1-threo insertions, and 3,1-isomerizations) per 10,000 propylene units, alternately more than 17 and less than 100 regio defects per 10,000 propylene units, alternately more than 20 or 30 or 40, but less than 95 regio defects, alternately less than 90 regio defects per 10,000 propylene units. The regio defects are determined using 13C NMR spectroscopy as described below.

The propylene homopolymer preferably has a heat of fusion ($\Delta Hf$) of 80 J/g or more, alternately of 90 J/g or more, alternately of 100 J/g or more, alternately of 110 J/g or more, alternately of 120 J/g or more. Heat of fusion (Hf or $\Delta Hf$) is determined by using Differential Scanning Calorimetry (DSC), as described in more detail below.

The disclosed propylene homopolymers have little or extremely low inorganic residues typically originating from the catalyst systems (i.e., from the catalyst precursors, activators, and optional supports) and the optional scavengers, such as, for example, alkyl aluminum compounds, or methyl alumoxane (MAO), etc. In some embodiments, the polymer product has less than 1 weight % silica, or less than 0.1 weight % silica, or less than 100 wt ppm silica, or less than 10 wt ppm silica. In other embodiments, the polymer product contains less than 100 wt ppm Group-4 transition metal, or less than 10 wt ppm Group-4 metal. In a preferred embodiment, the disclosed homopolymers have a combined Group-4 transition metal (e.g., Ti, Zr, or Hf) and aluminum content of 100 wt ppm or less, or 50 wt ppm or less, or 10 weight ppm or less. In a preferred embodiment, polymer has an inorganic catalyst residue of 100 weight ppm or less, the inorganic catalyst residue comprising Group 4, Group 6, and Group 8 transition metals, boron, aluminum, and silicon.

The disclosed propylene homopolymers preferably have narrow molecular weight distribution (MWD) expressed as the ratio of the number and weight average molecular weights (Mw/Mn, measured by GPC with DRI detector) of greater than 1 to less than 5, preferably 1.2 to 5, or 1.5 to 4, or 1.8 to 3.5 or 1.8 to 3, or 1.8 to 2.5. In a preferred embodiment the Mw/Mn is greater than 1 and less than or equal to 5. The disclosed propylene homopolymers preferably have a melt flow rate (MFR, ASTM D1238 at 230° C./2.16 kg) of about 15,000 g/10 min or less, alternately from 0.1 to 15,000, alternately from 1 to 10,000, alternately from 1 to 5,000, alternately from 10 to 200 g/10 min.

The disclosed propylene homopolymers preferably have a branching index (g') measured as described below of between 0.85 to 1.10, alternately from 0.90 to 1.05, alternately from 0.95 to 1.05.

Polymerization Process

In one or more embodiments, the process to produce polypropylene described herein includes contacting propylene, in a polymerization system, with one or more catalyst systems, at a temperature above 90° C. and at a pressure above 12 MPa. The polymerization advantageously takes place in a homogeneous polymerization system within a continuous polymerization reactor. In one or more embodiments, about 40 wt % or more propylene monomer, based on total weight of propylene monomer and optional inert solvent and/or inert diluent, and up to about 60 wt % inert solvent, based on total weight of propylene monomer and optional inert solvent and inert diluent, is fed into a polymerization reactor. Advantageously, about 28 wt % or more propylene monomer, based on total weight of the polymerization system, is present in the reactor effluent at steady state conditions. In one or more embodiments above or elsewhere herein, the monomer feed to the process can include one or more diluents. Scavengers and co-catalysts can also be included in the reactor feed.

In one or more embodiments, the monomer feed can contain 40 wt % or more, 45 wt % or more, or 50 wt % or more, 55 wt % or more, or 60 wt % or more, or 65 wt % or more, or 70 wt % or more, or 75 wt % or more, or 80 wt % or more, or 85 wt % or more, or 90 wt % or more propylene, based on total weight of propylene and optional inert solvents and/or inert diluents entering the reactor. In one or more embodiments, the monomer feed can contain monomer ranging from about 40 wt % to about 85 wt %, based on total weight of propylene and optional inert solvents and/or inert diluents entering the reactor. In one or more embodiments, the monomer feed can contain monomer ranging from about 40 wt % to about 75 wt %, based on total weight of monomer and optional inert solvents and/or inert diluents entering the reactor. In one or more embodiments, the monomer feed can contain propylene ranging from about 40 wt % to about 65 wt %, based on total weight of monomer and optional inert solvents and/or inert diluents entering the reactor.

In one or more embodiments, the polymerization system contains up to 60 wt % inert solvent. In one or more embodiments, the polymerization system contains greater than 35 wt % and less than 60 wt % inert solvent. In one or more embodiments, the polymerization system contains of from 40 wt % to 60 wt % inert solvent. In one or more embodiments, the inert solvent content of the polymerization system can range from a low of about 40 wt %, 45 wt %, or 50 wt % to a high of about 60 wt %. The inert solvent typically comprises hydrocarbons containing from 4 to 100 carbon atoms, advantageously from 4 to 8 carbon atoms. In certain embodiments, the inert solvent is or includes hexane isomers.

Not wishing to be bound by theory, it is believed that the high concentration of propylene increases the molecular weight of the product or allows higher-temperature operations while making the same polymer grade, thus enabling the production of polymer grades otherwise inaccessible, or reduces the cost of monomer recycle and reactor cooling. Increased concentration of solvents, on the other hand, depresses the cloud point of the polymerization system allowing homogeneous reactor operations at lower pressures, which in turn reduces the investment and compression costs. Therefore, there is a monomer/solvent concentration range for achieving the lowest production cost of a given polypropylene grade at a given location and at a given time. This optimum depends on many factors, among other things, on the cost of reactor construction, the cost of energy and cooling, etc.

In one or more embodiments, the density of the polymerization system is about 0.3 g/mL or more, or about 0.4 g/mL or more, or about 0.5 g/mL or more, or about 0.6 g/mL or more.

In one or more embodiments, the steady state polymer yield (i.e. conversion of propylene monomer to polymer product in a single pass through the reactor) is at least 5 wt % of the propylene monomer fed to the reactor. In one or more embodiments, the conversion of propylene monomer to polymer product in a single pass through the reactor is at least 10%. In one or more embodiments, the conversion of propylene monomer to polymer product in a single pass through the reactor is at least 20%, or at least 30%, or at least 40% but less than 90%, or less than 80%, or less than 70% in a single pass through the reactor.

In one or more embodiments, the polymerization conditions are sufficient to maintain the polymerization system in a single, homogeneous fluid state. For example, the minimum reaction temperature and pressure are selected so that the polymer produced, and the polymerization system that solvates it, remain single phase, i.e. above the polymerization system's cloud point and above its solid-fluid phase transition temperature and pressure with that polymer. Also, lower temperatures generally favor higher crystallinity and higher molecular weight, which are often key product attributes to meet. Furthermore, for homogeneous polymerization processes, the lower limits of reaction temperature can also be determined by the solid-fluid phase transition temperature. Reactors operated below the solid-fluid phase transition temperature of the reaction mixture can lead to operation problems due to fouling. For the production of highly crystalline polypropylenes (melting peak temperatures >150° C.) in homogeneous polymerization processes, the minimum operating temperature is about 93-100° C. The application of certain inert solvents can further reduce the minimum operation temperature of the fouling-free operation regime, although the substantial presence of inert solvents can reduce polymerization rate, product molecular weight, and can depress the melting peak temperature. The upper limit for temperature can be determined by the product properties that are strongly influenced by the reaction temperature. Since often polymers with higher molecular weights and/or higher melting temperatures are desired, high polymerization temperatures (>200° C.) are generally not advantageous. Increased temperatures can also degrade many known catalytic systems, providing another reason for avoiding excessive polymerization temperatures. From this perspective, temperatures below 250° C. are useful. Useful reactor conditions are influenced by the product specifications and reactor operation issues as outlined above. Advantageously, the polymerization temperatures for the production of the disclosed polypropylene are typically between 90 and 200° C., or between 90 and 180° C., or between 90 and 150° C., or between 93 and 150° C., or between 93 and 140° C., or between 95 and 140° C.

In one or more embodiments, the polymerization conditions are sufficient to dissolve the polymer product essentially in the monomer, which is present in the liquid state. These embodiments fall into the category of "bulk solution polymerization". In other embodiments, the polymerization conditions are sufficient to dissolve the polymer product essentially in the monomer, which is present in the supercritical state. These embodiments fall into the category of "bulk supercritical polymerization". The polymerization system can form one single fluid phase or two fluid phases.

In one or more embodiments, the reaction temperature and pressure can be selected so that the polymerization system remains at a pressure below the polymer's cloud point in the particular polymerization system, resulting in a two-phase polymerization system forming a polymer-rich phase and a polymer-lean phase. Some embodiments that are below the polymer's cloud point nonetheless operate above the polymer's crystallization temperature. The terms "two-phase system" or "two-phase polymerization system" refer to a polymerization system having two and, preferably, only two phases. In certain embodiments, the two phases are referenced as a "first phase" and a "second phase." In certain embodiments, the first phase is or includes a "monomer phase," which includes monomer(s) and can also include diluent and some or all the product of polymerization. In certain embodiments, the second phase is or includes a solid phase, which can include products of polymerization, e.g., macromers and polymer product, but not monomers, e.g., propylene. While operations with such two-phase polymerization system is feasible, they may cause operability issues, particularly downstream of the reactor, thus reactor operations above the cloud point, i.e., in a single-phase polymerization system are advantageous over the two-phase polymerization system.

In the disclosed processes for making highly crystalline polypropylenes with the above-described melting and supercooling properties and defect structure, the reaction pressure are typically no lower than the solid-fluid phase transition pressure of the polymer-containing dense fluid polymerization system at the reactor temperature. In another embodiment, the pressure is no lower than 10 MPa below the cloud point of the fluid reaction medium at the reactor temperature. In another embodiment, the pressure is between 12 and 1500 MPa, or between 12 and 207 MPa, or between 12 and 138 MPa, or between 69 MPa, or between 12 and 55 MPa, or between 34.5 and 138 MPa, or between 34.5 and 83 MPa, between 12 and 13.8 MPa. In another embodiment, the pressure is above 12, 20.7, or 34.5 MPa. In another embodiment, the pressure is below 1500, 500, 207, 138, 83, 69, 55, or 13.8 MPa. In another embodiment, the process to produce homopolypropylene described herein includes contacting propylene, in a polymerization system, with a catalyst or catalyst system, and optionally diluent or solvent, at a temperature above 80° C. (preferably above 92° C., preferably above 100° C., preferably between 110 and 150° C.) and at a pressure above 13 MPa (preferably above 20 MPa, preferably above 35 Mpa, preferably between 40 MPa and 340 MPa).

Catalyst System

Suitable polymerization catalysts for the disclosed processes producing highly crystalline polypropylenes in homogeneous dense fluid polymerization systems include metallocene catalysts. The catalysts can be activated by any activator affording the desired high catalytic activity. Exemplary, but non-limiting activators include aluminoxanes, such as methylaluminoxane (MAO), and ionizing activators such as non-coordinating anions, such as borates, etc. Useful non-coordinating anions include trimethylammoniumtetrakis (pentafluorophenyl)borate, N,N-dimethylaniliniumtetrakis (pentafluorophenyl)borate, triphenylcarbeniumtetrakis (perfluorophenyl)borate, and N,N-dimethylanilinium tetra (perfluorophenyl)borate, and the like. Useful aluminoxanes can be obtained from commercial sources, for example, Akzo-Nobel Corporation, and include methylaluminoxane, MMAO-3A, MMAO-12, and PMAO-IP. Combinations of aluminoxanes, combinations of non-coordinating anion activators, and combinations of aluminoxanes and non-coordinating anion activators can be used in the practice of this invention. Useful metallocene and non-metallocene catalyst compounds disclosed in U.S. Ser. No. 10/667,585 now U.S. Pat. No. 7,354,979, and US 2006-0293474 which are herein incorporated by reference. Further advantageous catalyst and activator compounds and combinations thereof useful herein are listed at pages 21 to page 85 of WO 2004/026921 and at page 29, paragraph [0101] to page 66, line 4 of WO 2004/026921. Advantageous activator compounds useful herein include those listed at paragraph [00135] pages 77-78 of WO 2004/026921. Another group of catalyst compounds and activators (e.g. catalyst systems comprising one or more activators and one or more non-metallocene metal-centered, heteroaryl ligand catalyst compounds, where the metal is chosen from the Group 4, 5, 6, the lanthanide series, or the actinide series of the Periodic Table of the Elements) useful herein are disclosed in Ser. No. 11/714,546, filed Mar. 6, 2007. Such catalyst compounds are also described in more detail in WO03/040095, WO 03/040201; WO 03/040202; WO 03/040233; WO 03/040442; and U.S. Pat. No. 7,087,690.

Further catalyst compounds and systems useful herein include those disclosed in: U.S. Pat. Nos. 6,897,276; 7,091,292; WO 2006/066126, "Unconventional catalysts for isotactic propene polymerization in solution developed by using high-throughput-screening technologies", Boussie, Thomas R.; et al. Angewandte Chemie, International Edition (2006), 45(20), 3278-3283.

Useful catalyst precursors include: dimethylsilyl(tetramethylcyclopentadienyl)(dodecylamido)titanium dimethyl; 1,1'-bis(4-triethylsilylphenyl)methylene-(cyclopentadienyl) (2,7-di-tertiary-butyl-9-fluorenyl)hafnium dimethyl; dimethylsilylbis(2-methyl-5,7-propylindenyl)zirconium dichloride; dimethylsilylbis(2-methyl-5-phenylindenyl)zirconium dichloride; dimethylsilylbis(2-ethyl-5-phenylindenyl)zirconium dichloride; dimethylsilylbis(2-methyl-4-phenylindenyl)zirconium dichloride or dimethyl; and diphenylmethylene(cyclopentadienyl)(fluoroenyl)hafnium dimethyl. Useful catalyst also include the dialkyl (such as dimethyl) analog of any of the dihalide catalyst precursors named above.

Useful metallocene compounds also include Me2Si-bis(2-R,4-Ph-indenyl)MX2, where

R is an alkyl group (such as methyl), Ph is phenyl or substituted phenyl, M is Hf, Zr or Ti, and X is a halogen or alkyl group (such as Cl or methyl), dimethylsilyl-bis(2-methyl,4-phenyl-indenyl)zirconium dimethyl (or dichloride), dimethylsilyl-bis(2-methyl,4-(3',5'-di-t-butyl-phenyl)-indenyl)zirconium dimethyl (or dichloride), dimethylsilyl-bis(2-methyl,4-naphthyl-indenyl)zirconium dimethyl (or dichloride), and dimethylsilyl-bis(2-methyl,4-(3',5'-di-t-butyl-naphthyl)-indenyl)zirconium dimethyl (or dichloride).

In some embodiments, the catalyst systems used herein comprise an activator (advantageously a non coordinating anion such as trimethylammoniumtetrakis(pentafluorophenyl)borate, N,N-dimethylaniliniumtetrakis(pentafluorophenyl)borate, triphenylcarbeniumtetra(perfluorophenyl)borate, or N,N-dimethylaniliniumtetra(perfluorophenyl)borate and the like, and a catalyst precursor compound represented by the formula:

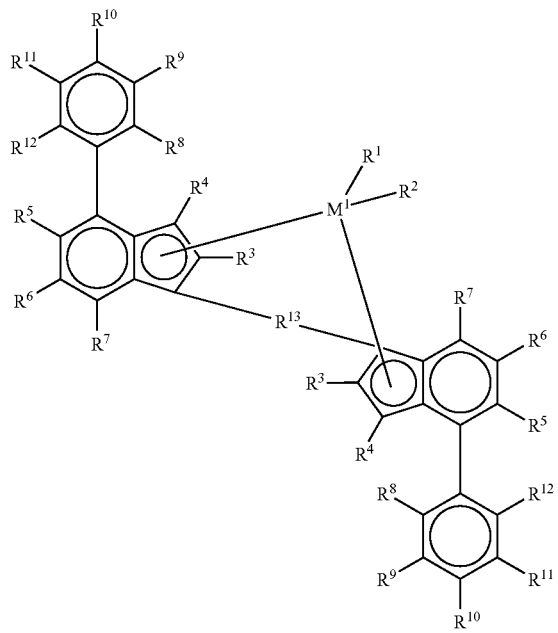

where M1 is selected from titanium, zirconium, hafnium, vanadium, niobium, tantalum, chromium, molybdenum, or tungsten (preferably zirconium and or hafnium);

R1 and R2 are identical or different and are selected from hydrogen atoms, C1-C10 alkyl groups, C1-C10 alkoxy groups, C6-C10 aryl groups, C6-C10 aryloxy groups, C2-C10 alkenyl groups, C2-C40 alkenyl groups, C7-C40 arylalkyl groups, C7-C40 alkylaryl groups, C8-C40 arylalkenyl groups, OH groups or halogen atoms; or conjugated dienes that are optionally substituted with one or more hydrocarbyl, tri(hydrocarbyl)silyl groups or hydrocarbyl tri(hydrocarbyl) silylhydrocarbyl groups (preferably R1 and R2 are an alkyl such as methyl or ethyl or are a halide such as chloride);

R3-R12 are the same or different and are selected from hydrogen atoms, halogen atoms, C1-C10 halogenated or unhalogenated alkyl groups, C6-C10 halogenated or unhalogenated aryl groups, C2-C10 halogenated or unhalogenated alkenyl groups, C7-C40 halogenated or unhalogenated arylalkyl groups, C7-C40 halogenated or unhalogenated alkylaryl groups, C8-C40 halogenated or unhalogenated arylalkenyl groups, —NR'2, —SR', —OR', —OSiR'3 or —PR'2 radicals in which R' is one of a halogen atom, a C1-C10 alkyl group, or a C6-C10 aryl group; or two or more adjacent radicals R5 to R7 together with the atoms connecting them can form one or more rings (preferably R3 is methyl, ethyl or butyl), and adjacent radicals R11 and R12 can form one or more saturated or aromatic rings (preferably R11 and R12 combine with the phenyl ring to form a substituted or unsubstituted naphthyl group), in an advantageous embodiment, R9 and R11 are a C1 to C20 hydrocarbyl group, or a C3 to C12 alkyl group, advantageously a t-butyl group; R13 is selected from:

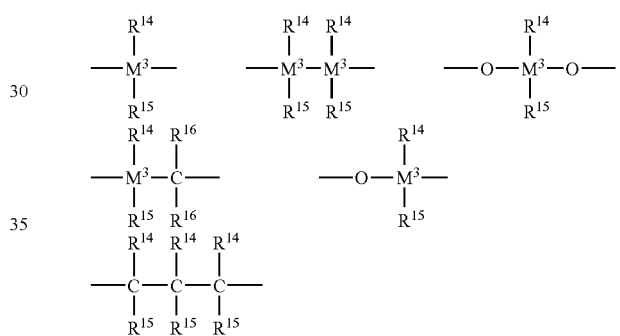

—B(R14)-, —Al(R14)-, —Ge—, —Sn—, —O—, —S—, —SO—, —SO2-, —N(R14)-, —CO—, —P(R14)- —P(O)—(R14)-, —B(NR14R15)- and —B[N (SiR14R15R16)2]-, R14, R15 and R16 are each independently selected from hydrogen, halogen, C1-C20 alkyl groups, C6-C30 aryl groups, C1-C20 alkoxy groups, C2-C20 alkenyl groups, C7-C40 arylalkyl groups, C8-C40 arylalkenyl groups and C7-C40 alkylaryl groups, or R14 and R15, together with the atom(s) connecting them, form a ring; and M3 is selected from carbon, silicon, germanium and tin, or R13 is represented by the formula:

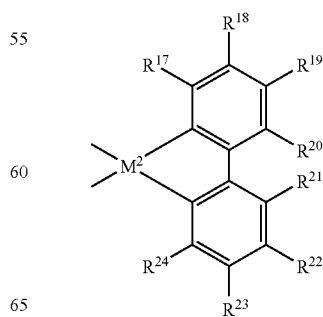

wherein R17 to R24 are as defined for R1 and R2, or two or more adjacent radicals R17 to R24, including R20 and R21, together with the atoms connecting them form one or more rings; M2 is carbon, silicon, germanium, or tin (preferably R13 is dimethyl silyl or diphenylsilyl).

The molar ratio of catalyst/activator employed advantageously ranges from 1:10,000 to 100:1, or from 1:5000 to 10:1, more advantageously from 1:100 to 1:1, or 1:10 to 1:1, or 1:5 to 1:1, or 1:2 to 1:1. In some embodiments, the activator can be used in combination with a tri(hydrocarbyl)aluminum or trialkyl aluminum compounds having from 1 to 10 carbons in each hydrocarbyl or alkyl group. Mixtures of these tri (hydrocarbyl)aluminum or trialkyl aluminum compounds may also be employed. In some embodiments, it is advantageous to employ these aluminum compounds for their beneficial ability to scavenge impurities such as oxygen, water, alcohols, and aldehydes from the polymerization mixture. Further advantageous aluminum compounds include trialkyl aluminum compounds having from 1 to 6 carbons in each alkyl group, especially those wherein the alkyl groups are methyl, ethyl, propyl, isopropyl, n-butyl, isobutyl, pentyl, neopentyl or isopentyl. The molar ratio of the catalytic metal complex to scavenger aluminum compound is advantageously from 1:10,000 to 1:100, or from 1:1000 to 1:100, or from 1:100 to 1:1, or from 1:10 to 1:1.

In a preferred embodiment, the homopolymer described herein is produced by polymerization of propylene at 93 to 150° C. and 34 to 240 MPa (where the temperature is above the cloud point temperature and the supercritical temperature of the polymerization system,) in the presence of an activator and a metallocene represented by the formula:

R2Q bis(2-R1-4-R2-Indenyl)MX2 wherein each R is, independently, hydrogen, a C1 to C20 hydrocarbyl group (preferably a C1 to C6 alkyl, phenyl, or substituted phenyl group, preferably methyl, ethyl, propyl, butyl, phenyl); Q is S1, CH2, or CH2-CH2; R1 is a C1 to C12 linear, branched, or cyclic alkyl group, R2 is phenyl or a substituted phenyl group (preferably 3'5' dialkyl phenyl, where the alkyl is a C1 to C6 group, such as t-butyl), M is Hf or Zr and X is a halide or a C1 to C20 hydrocarbyl group (preferably Cl, Br, methyl, ethyl, propyl or butyl). Preferred metallocenese include dimethylsilyl-bis(2-methyl, 4-phenyl-indenyl)zirconium dimethyl (or dichloride), dimethylsilyl-bis(2-methyl, 4-(3',5'-di-t-butyl-phenyl)-indenyl)zirconium dimethyl (or dichloride), dimethylsilyl-bis(2-methyl, 4-naphthyl-indenyl)zirconium dimethyl (or dichloride), dimethylsilyl-bis(2-methyl, 4-(3',5'-di-t-butyl-naphthyl)-indenyl)zirconium dimethyl (or dichloride), dimethylsilyl-bis(2-iospropyl, 4-naphthyl-indenyl)zirconium dimethyl (or dichloride), and dimethylsilyl-bis(2-isopropyl, 4-(3',5'-di-t-butyl-naphthyl)-indenyl)zirconium dimethyl (or dichloride).

Scavengers

Scavengers can be optionally used. A scavenger can be any compound or combination of compounds that destroy an impurity without destroying the catalyst. Impurities can harm catalysts by reducing their activity. Illustrative scavengers include, but are not limited to, alkyl aluminum compounds, such as trimethyl aluminum, triethyl aluminum, tri-isobutyl aluminum, and trioctyl aluminum. The scavenger can also be the same as the catalyst activator and would be applied in excess of what is needed to fully activate the catalyst. These scavengers can include, but are not limited to, aluminoxanes, such as methyl aluminoxane. The scavenger can be introduced to the reactor with the monomer feed or with any other feed stream. In one particular embodiment, the scavenger is introduced with the monomer-containing feed. The scavenger can be homogeneously dissolved in the polymerization system or can form a separate solid phase. In one particular embodiment, scavengers are dissolved in the polymerization system.

Solvents/Diluents

Solvents are typically hydrocarbon liquids that are intentionally fed to the polymerization reactor to aid the dissolution of the polymeric product. Solvents useful herein typically having a boiling point of 50° C. or more, or 70° C. or more, 100° C. or more, 120° C. or more, or 150° C. or more than the boiling point of propylene at 760 mm Hg (−47.6° C. at 760 mm Hg). Inert diluents, such as propane, ethane, butanes, etc., may also be introduced as impurities present in the monomer feed. In continuous reactor operations with monomer recycle, these inert diluents can build up, thus need to be purged from the system. While both the inert solvents and the inert diluents can aid the dissolution of the polymeric product, they are introduced differently and their effectiveness in the dissolution process is different. The presence of inert diluents typically is undesired since they dilute the system reducing reaction rates, and their purging leads to monomer losses and thus increase the cost of production. They are also typically less effective than solvents in aiding the dissolution of the product polypropylene. Therefore, the concentration of inert diluents is advantageously minimized in the feed and in the polymerization system. Inert solvents, on the other hand, are added to the polymerization system to aid the dissolution of the polymeric product and to absorb reaction heat. Advantageous inert solvents for the disclosed processes for making highly crystalline polypropylenes in a homogeneous polymerization dense fluid polymerization system include high-boiling hydrocarbons that include one or more of C4-C100 hydrocarbons. Particularly advantageous inert solvents include C4-C20, or C4-C12, or C2-C8 hydrocarbons. Illustrative advantageous inert solvents include, but not limited to, n-butane, isobutane, n-pentane, isopentane, n-hexane, mixed hexanes, heptanes, octanes, cyclopentane, cyclohexane, etc., single-ring aromatics, such as toluene and xylenes. In some embodiments, the inert solvent comprises hexanes. Advantageously, the diluent is recyclable. Advantageous solvents are soluble in the polymerization system, and inert to the monomer, the catalyst system, and any other components present in the reactor at the polymerization temperatures and pressures used.

Reactors

One or more reactors in series or in parallel can be used. The catalyst system can be delivered as a solution or slurry, either separately to the reactor, activated in-line just prior to the reactor, or preactivated and pumped as an activated solution or slurry to the reactor. Since heterogeneous (solid) catalysts are often difficult to handle in disclosed homogeneous polymerization processes (they tend to cause plugging and increased wear), advantageous catalyst systems are soluble in the polymerization system. In one embodiment, two solutions, one comprising the one or more catalyst precursor compounds and another comprising the activator, are blended in-line either in or prior to feeding them to the reactor. In other embodiments, the one or more catalyst precursor compounds are premixed with the one or more activators in solution, and a solution of the already activated catalyst is fed to the reactor.

Polymerizations can be carried out either in a single reactor, or in two or more reactors configured in series or parallel. In any operation mode, the catalyst system may comprise one, or more than one catalyst precursor and one or more activator. In both single- and multi-reactor operations, the one or more catalyst systems may be introduced at one point or at multiple points to the one or more polymerization reactors. Various feed configurations can be used depending on such factors as the desired product properties, such as, for example, molecular weight distribution, or catalyst stability. Such feed configurations are well known in the art of chemical engineering and can be readily optimized for the desired production scale and product properties using known engineering techniques.

In one or more embodiments, polymerization can occur in high-pressure reactors where, preferably, the reactor is substantially unreactive with the polymerization reaction components and is able to withstand the high pressures and temperatures that occur during the polymerization reaction. Such reactors are known as high-pressure reactors for purposes of this disclosure. Withstanding these high pressures and temperatures will allow the reactor to maintain the polymerization system in its homogeneous condition. Suitable reaction vessels include those known in the art to maintain high-pressure polymerization reactions. Suitable reactors are selected from autoclave, pump-around loop, autoclave, tubular, and combinations thereof.

Autoclave reactors may be operated in either a batch or continuous mode, although the continuous mode is advantageous. Tubular reactors always operate in continuous mode. Typically, autoclave reactors have length-to-diameter ratios of 1:1 to 20:1 and are fitted with a high-speed (up to 2000 RPM) multiblade stirrer and baffles arranged for optimal mixing. Commercial autoclave pressures are typically greater than 5 MPa with a maximum of typically less than 260 MPa. The maximum pressure of commercial autoclaves, however, may become higher with advances in mechanical and material science technologies.

When the autoclave has a low length-to-diameter ratio (such as less than four), the feed streams may be injected at one position along the length of the reactor. Reactors with large diameters may have multiple injection ports at nearly the same or different positions along the length of the reactor. When they are positioned at the same length of the reactor, the injection ports are radially distributed to allow for faster intermixing of the feed components with the reactor content. In the case of stirred tank reactors, the separate introduction of the catalyst and monomer may be advantageous in preventing the possible formation of hot spots in the unstirred feed zone between the mixing point and the stirred zone of the reactor. Injections at two or more positions along the length of the reactor is also possible and may be advantageous. In one exemplary embodiment, in reactors where the length-to-diameter ratio is from 4 to 20, the reactor may contain up to six different injection positions along the reactor length with multiple ports at some or each of the lengths.

Additionally, in the larger autoclaves, one or more lateral mixing devices may support the high-speed stirrer. These mixing devices can also divide the autoclave into two or more zones. Mixing blades on the stirrer may differ from zone to zone to allow for a different degree of plug flow and back mixing, largely independently, in the separate zones. Two or more autoclaves with one or more zones may connect in a series reactor cascade to increase residence time or to tailor polymer structure in a reactor train producing a polymer blending component. As previously described, a series reactor cascade or configuration consists of two or more reactors connected in series, in which the effluent of at least one upstream reactor is fed to the next reactor downstream in the cascade. Besides the effluent of the upstream reactor(s), the feed of any reactor in the series reactor cascade of a reactor train can be augmented with any combination of additional monomer, catalyst, or solvent fresh or recycled feed streams. Therefore, it should be understood that the polymer blending component leaving a reactor train of the process disclosed herein may itself be a blend of the same polymer with increased molecular weight and/or compositional dispersion or even a blend of homo- and copolymers.

Tubular reactors may also be used in the processes disclosed herein and more particularly tubular reactors capable of operating up to about 350 MPa. Tubular reactors are fitted with external cooling and one or more injection points along the (tubular) reaction zone. As in autoclaves, these injection points serve as entry points for monomers (such as propylene), one or more comonomer, catalyst, or mixtures of these. In tubular reactors, external cooling often allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation. Alternatively, tubular reactors may be fabricated with smooth, unpolished internal surfaces to address wall deposits. Tubular reactors generally may operate at pressures of up to 360 MPa, may have lengths of 100-2000 meters or 100-4000 meters, and may have internal diameters of less than 12.5 cm. Typically, tubular reactors have length-to-diameter ratios of 10:1 to 50,000:1 and include up to 10 different injection positions along its length.

Reactor trains that pair autoclaves with tubular reactors are also contemplated within the scope of the polymerization processes disclosed herein for making highly crystalline polypropylenes. In this reactor system, the autoclave typically precedes the tubular reactor or the two types of reactors form separate trains of a parallel reactor configuration. Such reactor systems may have injection of additional catalyst and/or feed components at several points in the autoclave, and more particularly along the tube length. In both autoclaves and tubular reactors, at injection, feeds are typically cooled to near ambient temperature or below to provide maximum cooling and thus maximum polymer production within the limits of maximum operating temperature. In autoclave operation, a preheater may operate at startup, but not after the reaction reaches steady state if the first mixing zone has some back-mixing characteristics. In tubular reactors, the first section of double-jacketed tubing may be heated (especially at start ups) rather than cooled and may operate continuously. A well-designed tubular reactor is characterized by plug flow wherein plug flow refers to a flow pattern with minimal radial flow rate differences. In both multizone autoclaves and tubular reactors, catalyst can not only be injected at the inlet, but also optionally at one or more points along the reactor. The catalyst feeds injected at the inlet and other injection points can be the same or different in terms of content, density, and concentration. Catalyst feed selection allows polymer design tailoring within a given reactor or reactor train and/or maintaining the desired productivity profile along the reactor length.

At the reactor outlet valve, the pressure drops to begin the separation of polymer and unreacted monomer, co-monomers, solvents and inerts, such as for example ethane, propane, hexane, and toluene. More particularly, at the reactor outlet valve, the pressure drops to levels below that which critical phase separation occurs, allowing for a polymer-rich phase and a polymer-lean phase in the downstream separation vessel. Typically, conditions remain above the polymer product's crystallization temperature. The autoclave or tubular reactor effluent may be depressurized on entering the downstream high-pressure separator (HPS). The temperature in the separation vessel is maintained above the solid-fluid phase separation temperature.

In addition to autoclave reactors, tubular reactors, or a combination of these reactors, loop-type reactors may be utilized in the polymerization processes disclosed herein. In this reactor type, monomer enters and polymer exits continuously at different points along the loop, while an in-line pump continuously circulates the contents (reaction liquid). The feed/product takeoff rates control the total average residence time. A cooling jacket removes reaction heat from the loop. Typically feed inlet temperatures are near to or below ambient temperatures to provide cooling to the exothermic reaction in the reactor operating above the crystallization temperature of the polymer product. The loop reactor may have a diameter of 41 to 61 cm and a length of 100 to 200 meters and may operate at pressures of 25 to 30 MPa. In addition, an in-line pump may continuously circulate the polymerization system through the loop reactor.

The polymerization processes disclosed herein may have residence times in the reactors as short as 0.5 seconds and as long as several hours, alternatively from 1 sec to 120 min, alternatively from 1 second to 60 minutes, alternatively from 5 seconds to 30 minutes, alternatively from 30 seconds to 30 minutes, alternatively from 1 minute to 60 minutes, and alternatively from 1 minute to 30 minutes. More particularly, the residence time may be selected from 10, or 30, or 45, or 50, seconds, or 1, or 5, or 10, or 15, or 20, or 25, or 30 or 60 or 120 minutes. Maximum residence times may be selected from 1, or 5, or 10, or 15, or 30, or 45, or 60, or 120 minutes.

The monomer-to-polymer conversion rate (also referred to as the conversion rate) is calculated by dividing the total quantity of polymer that is collected during the reaction time by the amount of monomer added to the reaction. Lower conversions may be advantageous to limit viscosity although increase the cost of monomer recycle. The optimum total monomer conversion thus will depend on reactor design, product slate, process configuration, etc., and can be determined by standard engineering techniques. Total monomer conversion during a single pass through any individual reactor of the fluid phase in-line process for blending disclosed herein may be up to 90%, or below 80%, or below 60% or 3-80%, or 5-80%, or 10-80%, or 15-80%, or 20-80%, or 25-60%, or 3-60%, or 5-60%, or 10-60%, or 15-60%, or 20-60%, or 10-50%, or 5-40%, or 10-40%, or 40-50%, or 15-40%, or 20-40%, or 30-40% or greater than 5%, or greater than 10%.

Advantageously, catalyst productivities range from 100 to 500,000 kg PP/(kg catalyst hr). This high level of catalyst productivity in combination of using unsupported catalysts, can result in low residual inorganic residues in the polymer product. In some embodiments, the polymer product has less than 1 weight % silica, or less than 0.1 weight % silica, or less than 100 wt ppm silica, or less than 10 wt ppm silica. In other embodiments, the polymer product contains less than less than 100 wt ppm Group-4 transition metal, or less than 10 wt ppm Group-4 metal. In a preferred embodiment, the disclosed homopolymers have a combined Group-4 transition metal (e.g., Ti, Zr, or Hf) and aluminum content of 100 wt ppm or less, or 50 wt ppm or less, or 10 weight ppm or less.

In another embodiment, this invention relates to:
1. An isotactic propylene homopolymer having:
    more than 15 and less than 100 regio defects (sum of 2,1-erythro and 2,1-threo insertions and 3,1-isomerizations) per 10,000 propylene units;
    an Mw (weight average molecular weight) of 35,000 g/mol or more;
    a peak melting temperature of greater than 149° C.;
    an mmmm pentad fraction of 0.85 or more;
    a heat of fusion of 80 J/g or more; and
    a peak melting temperature minus peak crystallization temperature (Tmp−Tcp) of less than or equal to (0.907 times Tmp) minus 99.64 (Tmp−Tcp<(0.907×Tmp)−99.64), as measured in ° C. on the homopolymer having 0 wt % nucleating agent.
2. The homopolymer of paragraph 1 wherein the polymer has an Mw/Mn ratio of greater than 1 to less than 5.
3. The homopolymer of paragraph 1 or 2 wherein the polymer has an inorganic catalyst residue of 100 weight ppm or less, the inorganic catalyst residue comprising Group 4, Group 6, and Group 8 transition metals, boron, aluminum, and silicon.
4. The homopolymer of paragraph 1, 2 or 3, where the peak melting temperature (Tmp) is from about 150° C. to about 170° C.
5. The homopolymer of any of paragraphs 1 to 4, wherein the homopolymer has a branching index (g') of between 0.85 to 1.10.
6. The homopolymer of any of paragraphs 1 to 5, wherein the peak melting temperature minus peak crystallization temperature (Tmp−Tcp) is less than or equal to (0.907 times Tmp) minus 100.14, (measured in ° C. on the homopolymer having 0 wt % nucleating agent).
7. The homopolymer of any of paragraphs 1 to 6, wherein the peak melting temperature minus peak crystallization temperature (Tmp−Tcp) is less than or equal to (0.907 times Tmp) minus 100.64, (measured in ° C. on the homopolymer having 0 wt % nucleating agent).
8. The homopolymer of any of paragraphs 1 to 7, wherein the homopolymer has an mmmm pentad fraction of 0.98 or greater.
9. The homopolymer of any of paragraphs 1 to 8 wherein the homopolymer has a heat of fusion of 100 J/g or more.
10. The homopolymer of any of paragraphs 1 to 9, wherein the homopolymer has an Mw of 100,000 g/mol or more.
11. The homopolymer of any of paragraphs 1 to 10 wherein the homopolymer has an Mw of 300,000 g/mol or more.
12. The homopolymer of any of paragraphs 1 to 11, where the peak melting temperature (Tmp) is from about 155° C. to about 170° C.
13. The homopolymer of any of paragraphs 1 to 12, wherein the homopolymer has more than 17 and less than 95 defects per 10,000 propylene units.
14. The homopolymer of any of paragraphs 1 to 13, wherein the homopolymer has an mmmm pentad fraction of 0.95 or greater.
15. The homopolymer of any of paragraphs 1 to 14, wherein the homopolymer is produced by polymerization of propylene in a reactor at 65 to 150° C. and 1.72 to 34.5 MPa, in the presence of an activator and a metallocene represented by the formula:

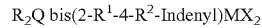

$$R_2Q \, bis(2\text{-}R^1\text{-}4\text{-}R^2\text{-}Indenyl)MX_2$$

wherein each R is, independently, hydrogen or a C1 to C20 hydrocarbyl group, Q is Si, $CH_2$ or $CH_2$—$CH_2$, $R^1$ is a C1 to C12 linear, branched or cyclic alkyl group, $R^2$ is phenyl or naphthyl or a substituted phenyl or naphthyl group, M is Hf or Zr and X is a halide or a C1 to C20 hydrocarbyl group, wherein about 35 wt % to about 80 wt % propylene monomer, and about 20 wt % to about 65 wt % solvent, based on total weight of propylene monomer and solvent, is fed into the polymerization reactor, and the polymerization occurs at a temperature above the solid-fluid phase transition temperature of the polymerization system and above a pressure greater than 1 MPa below the cloud point pressure of the polymerization system, provided however that the polymerization occurs: (1) at a temperature below the critical temperature of the polymerization system, or (2) at a pressure below the critical pressure of the polymerization system.

16. The homopolymer of paragraph 15, wherein Mw is 200,000 g/mol or greater, the mmmm pentad fraction is 0.98 or greater, the peak melting temperature (Tmp) is 150° C. to 170° C., the heat of fusion is 95 J/g or greater and wherein the metallocene is selected from the group consisting of: dimethylsilyl bis(2-methyl-4-phenylindenyl)zirconium dihalide or dimethylsilyl bis(2-methyl-4-phenylindenyl)zirconium dialkyl, dimethylsilyl bis(2-isopropyl-4-naphthylindenyl)zirconium dichloride or dimethylsilyl bis(2-isopropyl-4-naphthylindenyl)zirconium dialkyl, dimethylsilyl bis(2-methyl-4-naphthylindenyl)zirconium dichloride or dimethylsilyl bis(2-methyl-4-naphthylindenyl)zirconium dialkyl, dimethylsilyl bis(2-methyl-4-(3'5'-di-t-butyl)phenylindenyl)zirconium dichloride or dimethylsilyl bis(2-methyl-4-(3'5'-di-t-butyl)phenylindenyl)zirconium dialkyl, or mixtures thereof, and the activator is selected from the group consisting of alumoxane, trimethylammoniumtetrakis(pentafluorophenyl)borate, N,N-dimethylaniliniumtetrakis(pentafluorophenyl)borate, triphenylcarbeniumtetrakis(perfluorophenyl)borate, N,N-dimethylaniliniumtetrakis(perfluoronaphthyl)borate, N,N-dimethylaniliniumtetrakis(perfluorophenyl)borate, and mixtures thereof.

17. The homopolymer of paragraph 15 or 16, wherein the residence time is about 3 minutes to about 30 minutes.

18. The homopolymer of any of paragraph 1 to 14, wherein the homopolymer is produced by polymerization of propylene in a reactor at 93 to 150° C. and 34 to 240 MPa, where the temperature is above the cloud point temperature and above the supercritical temperature of the polymerization system, and in the presence of an activator and a metallocene represented by the formula:

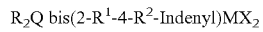

R$_2$Q bis(2-R$^1$-4-R$^2$-Indenyl)MX$_2$ wherein each R is, independently, hydrogen or a C1 to C20 hydrocarbyl group, Q is Si, CH$_2$ or CH$_2$—CH$_2$, R$^1$ is a C1 to C12 linear, branched or cyclic alkyl group, R$^2$ is phenyl or naphthyl or a substituted phenyl or naphthyl group, M is Hf or Zr and X is a halide or a C1 to C20 hydrocarbyl group.

19. The homopolymer of paragraph 18, wherein Mw is 200,000 g/mol or greater, the mmmm pentad fraction is 0.98 or greater, the peak melting temperature (Tmp) is 150° C. to 170° C., and the heat of fusion is 95 J/g or greater 20. The homopolymer of paragraph 18 or 19, wherein the metallocene is selected from the group consisting of: dimethylsilyl bis(2-methyl-4-phenylindenyl)zirconium dihalide or dimethylsilyl bis(2-methyl-4-phenylindenyl)zirconium dialkyl, dimethylsilyl bis(2-isopropyl-4-naphthylindenyl)zirconium dichloride or dimethylsilyl bis(2-isopropyl-4-naphthylindenyl)zirconium dialkyl, dimethylsilyl bis(2-methyl-4-naphthylindenyl)zirconium dichloride or dimethylsilyl bis(2-methyl-4-naphthylindenyl)zirconium dialkyl, dimethylsilyl bis(2-methyl-4-(3'5'-di-t-butyl)phenylindenyl)zirconium dichloride or dimethylsilyl bis(2-methyl-4-(3'5'-di-t-butyl)phenylindenyl)zirconium dialkyl, or mixtures thereof.

21. The homopolymer of paragraph 18, 19 or 20, wherein about 40 wt % to about 80 wt % propylene monomer, and about 20 wt % to about 60 wt % solvent, based on total weight of propylene monomer and solvent, is fed into the polymerization reactor.

22. The homopolymer of any of paragraphs 18 to 21, wherein the catalyst productivity is about 100,000 g polymer per g of metallocene or more.

23. The homopolymer of any of paragraphs 18 to 22, wherein the residence time is about 3 minutes to about 30 minutes.

24. The homopolymer of any of paragraphs 18 to 23, wherein the activator is selected from the group consisting of alumoxane, trimethylammoniumtetrakis(pentafluorophenyl)borate, N,N-dimethylaniliniumtetrakis(pentafluorophenyl)borate, triphenylcarbeniumtetrakis(perfluorophenyl)borate, N,N-dimethylaniliniumtetrakis(perfluoronaphthyl)borate, N,N-dimethylaniliniumtetrakis(perfluorophenyl)borate, and mixtures thereof.

25. An article, such as films, molded parts, fibers and fabrics, made from the homopolymer of any of paragraphs 1 to 24.

EXAMPLES

Propylene Polymerization at Supercritical Conditions

All polymerizations were performed in bulk polymerization systems (i.e., without using solvent, except for what was introduced with the catalyst solution, which did not exceed 10 wt %) and without monomer recycle. All polymerization experiments were performed in a continuous stirred tank reactor (CSTR) made by Autoclave Engineers, Erie Pa. The reactor was designed for operating at a maximum pressure and temperature of 207 MPa (30 kpsi) and 225° C., respectively. The nominal reactor volume was 150 mL with a working volume of 127 mL (working volume lower due to reactor internals). The reactor was equipped with an electric heater and with a stirrer with a magnetic drive. A pressure transducer located on the monomer feed line measured the pressure in the reactor. The temperature was measured inside the reactor using a type-K thermocouple. The reactor was protected against over-pressurization by automatically opening an air-actuated valve (High Pressure Company, Erie, Pa.) in case the reactor pressure exceeded the preset limit. A flush-mounted rupture disk located on the side of the reactor provided further protection against catastrophic pressure failure. All product lines were heated to ~150 C to prevent fouling. The reactor body had two heating bands that were controlled by a programmable logic control device (PLC). The reactor did not have cooling capability. Once the reactor lined out during polymerization, its temperature was controlled manually by adjusting the flow rates of the monomer and catalyst feeds. No external heating was necessary in most experiments, i.e. the reactor temperature was maintained by controlling the heat released by the polymerization process.

Two independent lock-hopper assemblies were used to manage the effluent flow from the reactor: one for waste collection during start up and shut down, and the other one for product collection during the balance period at lined out, steady state conditions. Each lock-hopper consisted of two air-actuated valves bracketing a short piece of high-pressure tubing. Changing the internal diameter and/or the length of the lock-hopper tube allowed the adjustment of the volume of the lock-hoppers. Aliquots of the reactor content were taken out continuously by running the lock-hopper valves in cycles. One lock-hopper cycle consisted of first opening and closing of the valve between the lock-hopper tube and the reactor followed by opening and closing the downstream valve. Adjustments in the frequency of the lock-hopper cycles allowed maintaining the desired reactor pressure at a preset feed rate. The volume and the frequency of the two lock-hoppers were always set the same to allow switching between the lock-hoppers without affecting the steady state condition of the reactor. A drain port on the bottom of the reactor was used to empty the reactor after each experiment.

The application of lock-hoppers for product removal afforded robust reactor operations independent of the properties of the polymer made and/or the polymer concentration in the effluent. This operation mode, however, introduced short-term fluctuations both in the pressure and the temperature of the reactor. Typical pressure and temperature fluctuations caused by the operation of the lock-hopper at 207 MPa (30 kpsi) reactor pressure were less than 20.7 MPa (3 kpsi) and 1.5 C, respectively. The reported reaction pressure and temperature values were obtained by calculating the averages of the pressure and temperature data acquired during the entire time of product collection, which can be referred to as balance period.

Propylene was fed from low-pressure cylinders equipped with a dip leg for liquid delivery to the reactor. Heating blankets provided heat to increase the cylinder head pressure to deliver the monomer to the feed pump at a pressure above the bubble point of the feed. The low-pressure monomer feed was also stabilized against bubble formation by cooling the pump head using chilled water running at 10 C. The monomer feed was purified using two separate beds in series: activated copper (reduced in flowing H2 at 225° C. and 1 bar) for oxygen removal and molecular sieve (5A, activated in flowing N2 at 270° C.) for water removal. The purified monomer feed was fed by a diaphragm pump (Model MhS 600/11, ProMinent Orlita, Germany) through the stirrer head into the reactor. The monomer flow rate was measured by a Coriolis mass flow meter (Model PROline Promass 80, Endress and Hauser) that was located downstream of the purification traps on the low-pressure side of the feed pump. The pressure fluctuation in the reactor caused some minor fluctuation in the feed rate. The reported feed flows were determined by averaging the flow rate during the entire balance period.

The catalyst feed solution was prepared inside an argon-filled dry box (Vacuum Atmospheres). The atmosphere in the glove box was purified to maintain <1 ppm O2 and <1 ppm water. All glassware was oven-dried for a minimum of 4 hours at 120° C. and transferred hot to the antechamber of the dry box. Stock solutions of the catalyst precursors and the activators were prepared using purified toluene and stored in amber bottles inside the dry box. Aliquots were taken to prepare fresh activated catalyst solutions before each polymerization experiment. Catalyst concentrations of the catalyst feed were adjusted to maintain the target reaction temperature at feed rates that introduced not more than 3-8 wt % of catalyst solvent (toluene) into the reactor. Due to the small scale and daily start-ups of our reactor, impurity levels were difficult to stabilize, thus catalytic activities varied from run to run. Nonetheless, catalytic activities were very high, particularly with non-coordinating anion activators, typically requiring catalyst concentrations on the order of 10 to 100 mol ppb in the combined feed to the reactor.

In a typical experiment, the reactor was preheated to ~10-15° C. below that of the desired reaction temperature. During the line-out period, the catalyst feed and lock-hopper rates were adjusted to reach and maintain the target reaction temperature and pressure. Once the reactor reached steady state at the desired conditions, product collection was switched from the waste collection to the on-balance product collection vessel. The reactor was typically run on-balance between 30 to 90 min, after which the effluent was redirected to the waste collection vessel and the reactor was shut down. The products were collected from the on-balance vessel. The products were vacuum-dried overnight at 70° C. before characterization. The conversion and reaction rates were determined based on the total feed used and the product yield during the balance period.

Catalyst productivity, expressed as g product per g catalyst, is the product of catalyst activity and residence time. In order to generate a scaleable kinetic characterization parameter for catalytic activity, we also determined the turnover frequency (TOF), expressed as mol monomer converted per mol catalyst in one second. TOF was calculated by dividing the average monomer conversion rate with the average catalyst inventory in the reactor. The latter in turn was determined by multiplying the catalyst feed rate with the residence time of the reaction medium. The residence time was derived from the reactor free volume and the volumetric flow rate of the reaction medium. The total mass flow was generated by summing of the individual feed flows. In order to convert mass flows into volumetric flows, the density of the reaction medium was calculated using a proprietary thermodynamic software. The software enabled the calculation of the density of polymer-containing blends at reactor conditions.

Anhydrous toluene from Sigma-Aldrich was used in catalyst preparation and for reactor flushing. Initially, it was used as received (18-liter stainless steel vessels, N2 head pressure) for reactor rinsing and flushing. Later, copper and molecular sieve traps were installed in the toluene feed line, the description of which is given earlier for the gas feed (vide supra). Propylene Grade 2.5 (BOC) was obtained in #100 low-pressure cylinders. The methylaluminoxane (MAO) activator (10 wt % in toluene) was purchased from Albermarle Corporation and was used as received. Tri-isobutylaluminum (Sigma-Aldrich) was used for passivating the feed line and the reactor if they were exposed to air during maintenance.

Tables 1a, 1b, and 1c list the catalyst precursor compositions, activators, MFR and NMR results (see also the footnotes of the tables). Tables 2a and 2b list the thermal properties (crystallization and melting data) and molecular weight data for the disclosed polypropylenes made at the conditions described in Tables 1a, 1b, and 1c. Note that each disclosed product listed in these tables is identified by a unique sample ID in the first column in Tables 1a, 1b, and 1c. These ID numbers are the same as those listed in Tables 2a and 2b. Melting and crystallization data listed were obtained at a cooling rate of 10° C./min using differential scanning calorimetry (DSC). Details of the experimental conditions are described later (vide infra). Heat of fusion of the melting endotherm listed in the column indicated by ($\Delta H_f$) is converted to % crystallinity as described later (vide infra). The difference between melting peak temperature (Tmp) and crystallization peak temperature (Tcp) is listed in the column indicated as supercooling range (Tmp–Tcp). Supercooling limit (SCL) was calculated using SCL=0.907Tmp−99.64 where SCL is the limiting Tmp–Tcp separating comparative and novel polypropylenes. Comparative polypropylenes have experimental Tmp–Tcp values larger than the SCL values, while the Tmp–Tcp values for the novel polypropylenes are equal or fall below the SCL values. Molecular weight (Mw, Mn, Mz) listed in these tables are obtained via GPC (details given later—vide infra).

FIG. 1 shows a plot of supercooling range (Tmp–Tcp) (data from Tables 2a and 2b) plotted against peak melting temperature (Tmp). Also plotted in this figure are comparative polypropylene products obtained from solution and slurry processes. As FIG. 1 demonstrates, the novel polypropylenes, from a variety of catalysts, cluster separately from the comparative products, showing a reduced supercooling range for products with the same melting peak temperature.

This in turn affords better crystallization properties for the novel disclosure products compared to comparative polypropylenes with identical melting peak temperatures. Tables 3 and 4 describe the process conditions and characterization data for the comparative solution products, while Tables 5, 6 and 7 show the corresponding details of the comparative slurry products. Note that in comparison, polypropylenes made with the process described herein show lower supercooling ranges (i.e., are at or fall below the SCL values) than comparative products. At a given peak melting temperature these products show higher peak crystallization temperature (lower values of supercooling Tmp−Tcp) than comparative products. The higher crystallization temperature (Tcp) implies faster crystallizability, without the need for external nucleating agents, versus the comparative polypropylene products from other processes. This is a desirable attribute for end-use articles such as films, fibers and fabrics, molded parts.

TABLE 1a

Process Conditions, MFR, and NMR Results for Inventive Polypropylenes

| Sample ID | Precursor Metallocene Ligand | Central Atom | $Cl_2$/ $Me_2$ | Activator | Reactor Temp °C. | Pressure MPa | Catalyst Productivity kg P/g prec | MFR g/10 min | Pentads mol fraction mmmm | Regio Defects/ 10,000 $C_3^-$ |
|---|---|---|---|---|---|---|---|---|---|---|
| S1 | 1 | Zr | Cl2 | MAO | 124 | 72.6 | 87 | 76 | 0.991 | 81 |
| S2 | 1 | Zr | Cl2 | MAO | 124 | 72.6 | 128 | 107 | 0.992 | 84 |
| S3 | 1 | Zr | Cl2 | MAO | 121 | 75.5 | 39 | 39 | 0.989 | 75 |
| S4 | 1 | Zr | Cl2 | MAO | 122 | 133.2 | 82 | 10 | 0.994 | 79 |
| S5 | 1 | Zr | Cl2 | MAO | 120 | 137.7 | 43 | 15 | 0.992 | 75 |
| S6 | 1 | Zr | Cl2 | MAO | 124 | 139.9 | 91 | 34 | 0.990 | 81 |
| S7 | 1 | Zr | Cl2 | MAO | 123 | 143.3 | 82 | 33 | 0.987 | 87 |
| S8 | 1 | Zr | Cl2 | MAO | 122 | 194.5 | 38 | 43 | 0.988 | 95 |
| S9 | 1 | Zr | Cl2 | MAO | 120 | 210.9 | 46 | 8 | 0.994 | 84 |
| S10 | 1 | Zr | Cl2 | MAO | 119 | 212.2 | 115 | 9 | 0.989 | 85 |
| S11 | 1 | Zr | Cl2 | MAO | 127 | 70.9 | 851 | 180 | 0.989 | 84 |
| S12 | 1 | Zr | Cl2 | MAO | 128 | 70.1 | 626 | 57 | 1.001 | 68 |
| S13 | 1 | Zr | Cl2 | MAO | 129 | 137.3 | 61 | 23 | 0.984 | 88 |
| S14 | 1 | Zr | Cl2 | MAO | 130 | 204.8 | 58 | 18 | 0.988 | 96 |
| S15 | 1 | Zr | Me2 | B1 | 100.1 | 40.2 | 632 | 18 | 0.990 | 44 |
| S16 | 1 | Zr | Me2 | B1 | 102.2 | 73.3 | 491 | 6 | 0.990 | 48 |
| S17 | 1 | Zr | Me2 | B1 | 106.9 | 72.7 | 807 | 26 | 0.990 | 52 |
| S18 | 1 | Zr | Me2 | B1 | 119.1 | 39.3 | 1224 | 80 | 0.988 | 53 |
| S19 | 1 | Zr | Me2 | B1 | 120.3 | 40.2 | 1093 | 122 | 0.983 | 52 |
| S20 | 1 | Zr | Me2 | B1 | 116.8 | 71.9 | 33 | 58 | 0.983 | 56 |
| S21 | 1 | Zr | Me2 | B1 | 119.1 | 71.9 | 1358 | 38 | 0.986 | 56 |
| S22 | 1 | Zr | Me2 | B1 | 119.4 | 138.7 | 283 | 19 | 0.989 | 62 |
| S23 | 1 | Zr | Me2 | B1 | 117.8 | 139.0 | 178 | 15 | 0.988 | 60 |
| S24 | 1 | Zr | Me2 | B1 | 126.7 | 33.8 | 1364 | 149 | 0.983 | 60 |
| S25 | 5 | Hf | Cl2 | MAO | 121 | 137.6 | 31 | 11 | 0.994 | 80 |
| S26 | 5 | Hf | Cl2 | MAO | 122 | 138.7 | 33 | 54 | 0.993 | 76 |
| S27 | 4 | Zr | Cl2 | MAO | 113 | 60.7 | 112 | 15 | 0.993 | 61 |
| S28 | 4 | Zr | Cl2 | MAO | 113 | 62.9 | 129 | 26 | 0.984 | 65 |
| S29 | 4 | Zr | Cl2 | MAO | 111 | 71.7 | 134 | 24 | 0.991 | 61 |
| S30 | 4 | Zr | Cl2 | MAO | 112 | 73.7 | 160 | 19 | 0.992 | 63 |

Ligands: 1 = rac-dimethylsilyl-bis(2-methyl, 4-phenylindenyl), 2 = rac-dimethylsilyl-bis(2-isopropyl, 4-naphthylindenyl), 3 = rac-dimethylsilyl-bis(2-methyl, 4-naphthylindenyl), and 4 = rac-dimethylsilyl-bis(2-methyl, 4-(3',5'-di-tert-butyl-phenyl)indenyl).
Activators: MAO = methylalumoxane, B1 = N,N-dimethylaniliniumtetrakis(pentafluorophenyl)borate, and C = N,N-dimethylaniliniumtetrakis(heptafluoronaphthyl)borate.

TABLE 1b

Process Conditions, MFR, and NMR Results for Inventive Polypropylenes

| Sample ID | Precursor Metallocene Ligand | Central Atom | $Cl_2$/ $Me_2$ | Activator | Reactor Temp °C. | Pressure MPa | Catalyst Productivity kg P/g prec | MFR g/10 min | Pentads mol fraction mmmm | Regio Defects/ 10,000 $C_3^-$ |
|---|---|---|---|---|---|---|---|---|---|---|
| S31 | 4 | Zr | Cl2 | MAO | 112 | 74.6 | 150 | 12 | 0.989 | 56 |
| S32 | 4 | Zr | Cl2 | MAO | 110.1 | 75.3 | 138 | 11 | 0.994 | 61 |
| S33 | 4 | Zr | Cl2 | MAO | 111 | 202.5 | 79 | 2 | 0.995 | 72 |
| S34 | 4 | Zr | Cl2 | MAO | 116 | 36.7 | 145 | 63 | 0.995 | 75 |
| S35 | 4 | Zr | Cl2 | MAO | 117 | 36.7 | 150 | 85 | 0.995 | 58 |
| S36 | 4 | Zr | Cl2 | MAO | 116 | 48.3 | 160 | 45 | 0.990 | 69 |
| S37 | 4 | Zr | Cl2 | MAO | 116 | 60.3 | 165 | 30 | 0.994 | 67 |
| S38 | 4 | Zr | Cl2 | MAO | 114 | 61.1 | 164 | 31 | 0.989 | 70 |
| S39 | 4 | Zr | Cl2 | MAO | 114 | 62.9 | 153 | 26 | 0.992 | 69 |
| S40 | 4 | Zr | Cl2 | MAO | 114 | 63.5 | 143 | 30 | 0.989 | 66 |
| S41 | 4 | Zr | Cl2 | MAO | 118 | 48.1 | 127 | 51 | 0.996 | 65 |
| S42 | 4 | Zr | Cl2 | MAO | 118 | 48.2 | 150 | 73 | 0.995 | 64 |
| S43 | 4 | Zr | Cl2 | MAO | 120 | 48.2 | 147 | 77 | 0.999 | 75 |
| S44 | 4 | Zr | Cl2 | MAO | 118 | 48.4 | 158 | 69 | 0.998 | 66 |

TABLE 1b-continued

Process Conditions, MFR, and NMR Results for Inventive Polypropylenes

| | Precursor | | | | Reactor | | Catalyst | | Pentads | Regio |
|---|---|---|---|---|---|---|---|---|---|---|
| Sample ID | Metallocene Ligand | Central Atom | $Cl_2/Me_2$ | Activator | Temp °C. | Pressure MPa | Productivity kg P/g prec | MFR g/10 min | mol fraction mmmm | Defects/ 10,000 $C_3^-$ |
| S45 | 4 | Zr | Cl2 | MAO | 118 | 49.1 | 158 | 64 | 0.997 | 65 |
| S46 | 4 | Zr | Cl2 | MAO | 120 | 202.0 | 111 | 8 | 0.996 | 68 |
| S47 | 4 | Zr | Me2 | C | 103.2 | 204.0 | 107 | 1 | 0.992 | 48 |
| S48 | 4 | Zr | Me2 | B1 | 111 | 48.3 | 23 | 12 | 0.995 | 39 |
| S49 | 4 | Zr | Me2 | B1 | 114 | 54.4 | 33 | 21 | 0.994 | 41 |
| S50 | 4 | Zr | Me2 | B1 | 114.2 | 57.3 | 611 | 17 | 0.995 | 43 |
| S51 | 4 | Zr | Me2 | B1 | 117 | 51.6 | 39 | 22 | 0.995 | 45 |
| S52 | 4 | Zr | Me2 | B1 | 116.7 | 58.0 | 76 | 28 | 0.994 | 44 |
| S53 | 4 | Zr | Me2 | B1 | 117.8 | 56.2 | 519 | 32 | 0.991 | 44 |
| S54 | 4 | Zr | Me2 | B1 | 118 | 56.0 | 136 | 27 | 0.992 | 44 |
| S55 | 4 | Zr | Me2 | B1 | 118 | 57.6 | 80 | 37 | 0.992 | 45 |
| S56 | 4 | Zr | Me2 | B1 | 118.1 | 55.6 | 717 | 36 | 0.991 | 46 |
| S57 | 4 | Zr | Me2 | B1 | 118.1 | 56.0 | 431 | 29 | 0.991 | 46 |
| S58 | 4 | Zr | Me2 | B1 | 118 | 49.6 | 46 | 87 | 0.994 | 46 |
| S59 | 4 | Zr | Me2 | B1 | 118.2 | 57.4 | 207 | 35 | 0.993 | 48 |
| S60 | 4 | Zr | Me2 | B1 | 118.6 | 57.3 | 682 | 30 | 0.990 | 45 |

Ligands: 1 = rac-dimethylsilyl-bis(2-methyl, 4-phenylindenyl), 2 = rac-dimethylsilyl-bis(2-isopropyl, 4-naphthylindenyl), 3 = rac-dimethylsilyl-bis(2-methyl, 4-naphthylindenyl), and 4 = rac-dimethylsilyl-bis(2-methyl, 4-(3',5'-di-tert-butyl-phenyl)indenyl).
Activators: MAO = methylalumoxane, B1 = N,N-dimethylaniliniumtetrakis(pentafluorophenyl)borate, and C = N,N-dimethylaniliniumtetrakis(heptafluoronaphthyl)borate.

TABLE 1c

Process Conditions, MFR, and NMR Results for inventive Polypropylenes

| | Precursor | | | | Reactor | | Catalyst | | Pentads | Regio |
|---|---|---|---|---|---|---|---|---|---|---|
| Sample ID | Metallocene Ligand | Central Atom | $Cl_2/Me_2$ | Activator | Temp °C. | Pressure MPa | Productivity kg P/g prec | MFR g/10 min | mol fraction mmmm | Defects/ 10,000 $C_3^-$ |
| S61 | 4 | Zr | Me2 | B1 | 119 | 49.3 | 46 | 65 | 0.990 | 43 |
| S62 | 4 | Zr | Me2 | B1 | 118.7 | 58.9 | 974 | 37 | 0.991 | 46 |
| S63 | 4 | Zr | Me2 | B1 | 118.7 | 56.9 | 576 | 34 | 0.992 | 44 |
| S64 | 4 | Zr | Me2 | B1 | 118.7 | 57.6 | 207 | 28 | 0.994 | 47 |
| S65 | 4 | Zr | Me2 | B1 | 118.9 | 55.8 | 458 | 37 | 0.991 | 46 |
| S66 | 4 | Zr | Me2 | B1 | 119 | 56.0 | 599 | 38 | 0.989 | 45 |
| S67 | 4 | Zr | Me2 | B1 | 119.2 | 57.8 | 505 | 53 | 0.993 | 47 |
| S68 | 4 | Zr | Me2 | B1 | 119.2 | 56.4 | 513 | 38 | 0.990 | 46 |
| S69 | 4 | Zr | Me2 | B1 | 119.2 | 56.2 | 474 | 34 | 0.989 | 45 |
| S70 | 4 | Zr | Me2 | B1 | 119.2 | 56.4 | 481 | 39 | 0.984 | 48 |
| S71 | 4 | Zr | Me2 | B1 | 119.3 | 57.4 | 200 | 35 | 0.992 | 45 |
| S72 | 4 | Zr | Me2 | B1 | 119.3 | 55.7 | 523 | 37 | 0.989 | 46 |
| S73 | 4 | Zr | Me2 | B1 | 119.3 | 56.2 | 346 | 37 | 0.986 | 47 |
| S74 | 4 | Zr | Me2 | B1 | 119.3 | 56.2 | 714 | 34 | 0.991 | 46 |
| S75 | 4 | Zr | Me2 | B1 | 119.4 | 51.6 | 40 | 54 | 0.993 | 50 |
| S76 | 4 | Zr | Me2 | B1 | 121 | 52.0 | 100 | 50 | 0.992 | 51 |
| S77 | 4 | Zr | Me2 | B1 | 120 | 57.2 | 916 | 37 | 0.988 | 48 |
| S78 | 4 | Zr | Me2 | B1 | 119.8 | 58.0 | 539 | 46 | 0.993 | 47 |
| S79 | 2 | Zr | Cl2 | MAO | 112 | 134.8 | 119 | 1894 | 0.982 | 41 |
| S80 | 2 | Zr | Cl2 | MAO | 112 | 136.5 | 128 | 1724 | 0.987 | 32 |
| S81 | 2 | Zr | Cl2 | MAO | 112 | 135.6 | 89 | 1590 | 0.970 | 27 |
| S82 | 2 | Zr | Cl2 | MAO | 109 | 137.7 | 126 | 1476 | 0.989 | 35 |
| S83 | 2 | Zr | Cl2 | MAO | 110 | 197.6 | 100 | 620 | 0.985 | 39 |
| S84 | 2 | Zr | Cl2 | MAO | 121 | 197.3 | 68 | 2418 | 0.979 | 40 |
| S85 | 3 | Zr | Cl2 | MAO | 111 | 187.6 | 71 | 2 | 0.995 | 89 |
| S86 | 3 | Zr | Cl2 | MAO | 112 | 194.5 | 130 | 11 | 0.993 | 106 |
| S87 | 3 | Zr | Cl2 | MAO | 123 | 192.0 | 140 | 19 | 0.983 | 64 |

Ligands: 1 = rac-dimethylsilyl-bis(2-methyl, 4-phenylindenyl), 2 = rac-dimethylsilyl-bis(2-isopropyl, 4-naphthylindenyl), 3 = rac-dimethylsilyl-bis(2-methyl, 4-naphthylindenyl), and 4 = rac-dimethylsilyl-bis(2-methyl, 4-(3',5'-di-tert-butyl-phenyl)indenyl).
Activators: MAO = methylalumoxane, B1 = N,N-dimethylaniliniumtetrakis(pentafluorophenyl)borate, and C = N,N-dimethylaniliniumtetrakis(heptafluoronaphthyl)borate.

TABLE 2a

Thermal Characterization and GPC results for Inventive Polypropylenes

| Sample ID | Crystallization (DSC) $T_{c, onset}$ °C. | $T_{c, peak}$ °C. | Melting (2nd Heat) (DSC) $T_{m, peak}$ °C. | $\Delta H_f$ J/g | Cryst. % | Tmp − Tcp Supercooling °C. | SCL °C. | DRI (GPC) Mz kg/mol | Mw kg/mol | Mn kg/mol | Mw/Mn | Mz/Mw |
|---|---|---|---|---|---|---|---|---|---|---|---|---|
| S1 | 119.1 | 116.0 | 151.5 | 100.7 | 48.6 | 35.5 | 37.8 | 235.5 | 119.9 | 55.4 | 2.16 | 1.96 |
| S2 | 116.2 | 113.0 | 149.3 | 104.0 | 50.2 | 36.3 | 35.8 | 261.5 | 134.5 | 65.5 | 2.05 | 1.94 |
| S3 | 117.6 | 113.5 | 150.7 | 92.2 | 44.5 | 37.2 | 37.0 | 252.0 | 149.6 | 64.0 | 2.34 | 1.68 |
| S4 | 117.7 | 114.5 | 150.3 | 103.7 | 50.1 | 35.8 | 36.7 | 321.7 | 206.9 | 109.7 | 1.89 | 1.55 |
| S5 | 117.6 | 114.4 | 150.1 | 98.7 | 47.6 | 35.7 | 36.5 | 329.5 | 202.9 | 84.8 | 2.39 | 1.62 |
| S6 | 115.4 | 111.8 | 149.7 | 101.8 | 49.1 | 37.9 | 36.1 | 270.5 | 172.5 | 88.3 | 1.95 | 1.57 |
| S7 | 115.6 | 111.1 | 149.1 | 97.7 | 47.2 | 38.0 | 35.6 | 305.7 | 185.5 | 89.0 | 2.08 | 1.65 |
| S8 | 115.1 | 110.9 | 148.1 | 80.4 | 38.8 | 37.2 | 34.7 | 265.9 | 153.9 | 50.3 | 3.06 | 1.73 |
| S9 | 116.8 | 113.4 | 149.2 | 88.0 | 42.5 | 35.8 | 35.7 | 425.3 | 267.4 | 122.1 | 2.19 | 1.59 |
| S10 | 116.7 | 113.3 | 149.9 | 88.3 | 42.6 | 36.6 | 36.3 | 395.2 | 247.6 | 119.1 | 2.08 | 1.60 |
| S11 | 117.2 | 113.9 | 149.8 | 98.5 | 47.6 | 35.9 | 36.2 | 175.5 | 106.4 | 53.3 | 2.00 | 1.65 |
| S12 | 118.7 | 114.1 | 150.8 | 97.3 | 47.0 | 36.7 | 37.1 | 240.4 | 145.4 | 71.7 | 2.03 | 1.65 |
| S13 | 115.9 | 113.0 | 150.6 | 111.1 | 53.6 | 37.6 | 37.0 | 287.9 | 168.6 | 57.6 | 2.93 | 1.71 |
| S14 | 115.2 | 111.0 | 148.9 | 87.4 | 42.2 | 37.9 | 35.4 | 323.5 | 198.8 | 80.8 | 2.46 | 1.63 |
| S15 | 121.3 | 115.5 | 155.0 | 100.1 | 48.3 | 39.5 | 40.9 | 340.7 | 207.5 | 102.2 | 2.03 | 1.64 |
| S16 | 116.9 | 113.3 | 153.4 | 93.8 | 45.3 | 40.1 | 39.5 | 475.0 | 271.0 | 137.5 | 1.97 | 1.75 |
| S17 | 117.8 | 113.7 | 151.9 | 87.2 | 42.1 | 38.2 | 38.2 | 431.5 | 258.7 | 118.8 | 2.18 | 1.67 |
| S18 | 119.4 | 114.7 | 153.5 | 96.6 | 46.6 | 38.8 | 39.6 | 207.5 | 129.9 | 68.7 | 1.89 | 1.60 |
| S19 | 120.6 | 116.7 | 152.6 | 100.6 | 48.6 | 35.9 | 38.8 | 176.9 | 110.0 | 55.7 | 1.97 | 1.61 |
| S20 | 116.7 | 113.2 | 152.4 | 93.8 | 45.3 | 39.2 | 38.6 | 262.9 | 161.8 | 83.4 | 1.94 | 1.62 |
| S21 | 118.4 | 114.5 | 151.3 | 94.7 | 45.7 | 36.8 | 37.6 | 285.9 | 179.0 | 94.9 | 1.89 | 1.60 |
| S22 | 115.7 | 113.0 | 151.1 | 96.8 | 46.7 | 38.1 | 37.4 | 322.1 | 195.9 | 92.2 | 2.12 | 1.64 |
| S23 | 116.4 | 113.3 | 152.9 | 99.1 | 47.8 | 39.7 | 39.0 | 240.0 | 145.8 | 74.3 | 1.96 | 1.65 |
| S24 | 117.0 | 112.8 | 150.8 | 99.3 | 47.9 | 38.0 | 37.1 | 307.5 | 165.8 | 69.4 | 2.39 | 1.85 |
| S25 | 116.2 | 112.6 | 150.7 | 103.1 | 49.8 | 38.1 | 37.0 | 352.7 | 229.3 | 118.3 | 1.94 | 1.54 |
| S26 | 116.1 | 112.4 | 149.7 | 91.9 | 44.4 | 37.3 | 36.1 | 219.8 | 137.4 | 72.0 | 1.91 | 1.60 |
| S27 | 118.4 | 115.3 | 152.6 | 87.7 | 42.3 | 37.3 | 38.8 | 334.4 | 200.4 | 100.2 | 2.00 | 1.67 |
| S28 | 117.6 | 114.0 | 152.1 | 97.2 | 46.9 | 38.1 | 38.3 | 297.0 | 181.2 | 91.4 | 1.98 | 1.64 |
| S29 | 119.9 | 116.6 | 153.8 | 100.9 | 48.7 | 37.2 | 39.9 | 339.2 | 204.1 | 100.2 | 2.04 | 1.66 |
| S30 | 118.6 | 115.9 | 153.1 | 99.8 | 48.2 | 37.2 | 39.2 | 314.1 | 189.2 | 94.1 | 2.01 | 1.66 |
| S31 | 116.7 | 113.4 | 151.5 | 93.0 | 44.9 | 38.1 | 37.8 | 389.4 | 230.1 | 105.7 | 2.18 | 1.69 |
| S32 | 119.6 | 116.7 | 154.3 | 101.7 | 49.1 | 37.6 | 40.3 | 378.9 | 230.9 | 115.8 | 1.99 | 1.64 |
| S33 | 119.3 | 116.2 | 153.3 | 104.0 | 50.2 | 37.1 | 39.4 | 581.0 | 360.7 | 171.6 | 2.10 | 1.61 |
| S34 | 117.9 | 114.5 | 153.4 | 98.5 | 47.6 | 38.9 | 39.5 | 255.7 | 151.9 | 76.7 | 1.98 | 1.68 |
| S35 | 117.4 | 114.3 | 153.4 | 97.1 | 46.9 | 39.1 | 39.5 | 239.8 | 143.8 | 73.5 | 1.96 | 1.67 |
| S36 | 118.1 | 114.8 | 152.9 | 100.0 | 48.3 | 38.1 | 39.0 | 252.0 | 152.2 | 77.5 | 1.96 | 1.66 |
| S37 | 117.1 | 114.0 | 151.6 | 101.8 | 49.1 | 37.6 | 37.9 | 265.5 | 155.8 | 76.8 | 2.03 | 1.70 |
| S38 | 118.4 | 116.0 | 152.1 | 101.6 | 49.0 | 36.1 | 38.3 | 277.3 | 167.6 | 84.3 | 1.99 | 1.65 |
| S39 | 117.9 | 114.7 | 152.3 | 96.5 | 46.6 | 37.6 | 38.5 | 265.5 | 161.6 | 82.6 | 1.96 | 1.64 |
| S40 | 117.8 | 114.1 | 154.0 | 93.7 | 45.2 | 39.9 | 40.0 | 301.4 | 180.2 | 88.8 | 2.03 | 1.67 |
| S41 | 118.3 | 114.7 | 153.1 | 98.2 | 47.4 | 38.4 | 39.2 | 257.1 | 153.2 | 76.7 | 2.00 | 1.68 |
| S42 | 120.3 | 116.8 | 153.0 | 99.7 | 48.1 | 36.2 | 39.1 | 260.4 | 153.0 | 76.0 | 2.01 | 1.70 |
| S43 | 117.6 | 114.1 | 152.2 | 95.5 | 46.1 | 38.1 | 38.4 | 235.7 | 140.3 | 70.1 | 2.00 | 1.68 |
| S44 | 117.5 | 114.3 | 152.0 | 96.5 | 46.6 | 37.7 | 38.2 | 243.2 | 143.3 | 70.6 | 2.03 | 1.70 |
| S45 | 120.0 | 116.0 | 154.0 | 99.9 | 48.2 | 38.0 | 40.0 | 235.8 | 141.1 | 68.7 | 2.06 | 1.67 |
| S46 | 119.8 | 115.4 | 152.6 | 99.0 | 47.8 | 37.2 | 38.8 | 432.7 | 272.5 | 130.7 | 2.08 | 1.59 |

Supercooling Limit (SCL) given by SCL = 0.907x − 99.64, where x is Tmp
In the above examples S1 to S46, branching index (g')values ranged between 0.874 to 1.074.

TABLE 2b

Thermal Characterization and GPC results for Inventive Polypropylenes

| Sample ID | Crystallization (DSC) $T_{c, onset}$ °C. | $T_{c, peak}$ °C. | Melting (2nd Heat) (DSC) $T_{m, peak}$ °C. | $\Delta H_f$ J/g | Cryst. % | Tmp − Tcp Supercooling °C. | SCL °C. | DRI (GPC) Mz kg/mol | Mw kg/mol | Mn kg/mol | Mw/Mn | Mz/Mw |
|---|---|---|---|---|---|---|---|---|---|---|---|---|
| S47 | 117.4 | 114.2 | 155.5 | 90.5 | 43.7 | 41.4 | 41.4 | 678.3 | 436.5 | 215.8 | 2.02 | 1.55 |
| S48 | 118.5 | 114.7 | 156.6 | 97.5 | 47.1 | 41.9 | 42.4 | 298.2 | 189.9 | 98.1 | 1.94 | 1.57 |
| S49 | 117.2 | 114.3 | 155.1 | 98.4 | 47.5 | 40.8 | 41.0 | 239.1 | 151.7 | 79.8 | 1.90 | 1.58 |
| S50 | 120.2 | 115.0 | 155.8 | 96.2 | 46.4 | 40.8 | 41.7 | 361.8 | 226.1 | 118.6 | 1.91 | 1.60 |
| S51 | 119.9 | 115.0 | 155.8 | 95.5 | 46.1 | 40.8 | 41.7 | 323.1 | 205.9 | 111.0 | 1.86 | 1.57 |
| S52 | 118.1 | 114.5 | 155.2 | 97.3 | 47.0 | 40.7 | 41.1 | 326.2 | 199.0 | 98.9 | 2.01 | 1.64 |
| S53 | 118.4 | 114.5 | 154.5 | 98.9 | 47.7 | 40.0 | 40.5 | 303.0 | 188.1 | 96.3 | 1.95 | 1.61 |
| S54 | 118.0 | 114.4 | 155.8 | 97.3 | 47.0 | 41.4 | 41.7 | 334.3 | 200.2 | 92.0 | 2.18 | 1.67 |
| S55 | 117.9 | 113.6 | 155.2 | 97.3 | 47.0 | 41.6 | 41.1 | 268.6 | 168.4 | 91.0 | 1.85 | 1.59 |
| S56 | 118.3 | 114.3 | 155.3 | 99.6 | 48.1 | 41.0 | 41.2 | 278.6 | 174.4 | 89.0 | 1.96 | 1.60 |
| S57 | 118.1 | 114.5 | 155.0 | 99.4 | 48.0 | 40.5 | 40.9 | 315.3 | 193.5 | 95.8 | 2.02 | 1.63 |

TABLE 2b-continued

Thermal Characterization and GPC results for Inventive Polypropylenes

| | Crystallization (DSC) | | Melting (2nd Heat) (DSC) | | | Tmp – Tcp | | DRI (GPC) | | | | |
|---|---|---|---|---|---|---|---|---|---|---|---|---|
| Sample ID | $T_{c,\,onset}$ °C. | $T_{c,\,peak}$ °C. | $T_{m,\,peak}$ °C. | $\Delta H_f$ J/g | Cryst. % | Supercooling °C. | SCL °C. | Mz kg/mol | Mw kg/mol | Mn kg/mol | Mw/Mn | Mz/Mw |
| S58 | 118.4 | 114.9 | 155.3 | 98.8 | 47.7 | 40.4 | 41.2 | 496.2 | 188.6 | 39.7 | 4.76 | 2.63 |
| S59 | 117.4 | 113.9 | 155.1 | 97.9 | 47.3 | 41.2 | 41.0 | 278.4 | 176.4 | 96.2 | 1.83 | 1.58 |
| S60 | 117.0 | 113.5 | 155.2 | 97.4 | 47.0 | 41.7 | 41.1 | 304.5 | 187.2 | 94.3 | 1.98 | 1.63 |
| S61 | 119.9 | 115.2 | 155.8 | 96.1 | 46.4 | 40.6 | 41.7 | 300.9 | 187.1 | 92.1 | 2.03 | 1.61 |
| S62 | 119.6 | 115.2 | 155.5 | 95.4 | 46.1 | 40.3 | 41.4 | 286.6 | 178.7 | 94.7 | 1.89 | 1.60 |
| S63 | 119.5 | 115.1 | 155.5 | 97.6 | 47.1 | 40.4 | 41.4 | 272.4 | 173.2 | 96.3 | 1.80 | 1.57 |
| S64 | 118.6 | 114.6 | 155.1 | 99.2 | 47.9 | 40.5 | 41.0 | 265.8 | 168.6 | 93.6 | 1.80 | 1.58 |
| S65 | 119.0 | 115.3 | 155.4 | 97.3 | 47.0 | 40.1 | 41.3 | 293.9 | 178.7 | 90.0 | 1.99 | 1.65 |
| S66 | 118.1 | 114.8 | 155.4 | 100.9 | 48.7 | 40.6 | 41.3 | 280.4 | 171.5 | 85.5 | 2.01 | 1.64 |
| S67 | 116.3 | 113.6 | 153.5 | 96.6 | 46.6 | 39.9 | 39.6 | 268.1 | 169.5 | 83.3 | 2.03 | 1.58 |
| S68 | 119.1 | 115.3 | 155.5 | 98.9 | 47.7 | 40.2 | 41.4 | 284.5 | 178.7 | 94.4 | 1.89 | 1.59 |
| S69 | 118.7 | 115.3 | 155.4 | 99.9 | 48.2 | 40.1 | 41.3 | 293.1 | 182.0 | 92.8 | 1.96 | 1.61 |
| S70 | 119.2 | 115.0 | 155.7 | 100.1 | 48.3 | 40.7 | 41.6 | 284.3 | 179.7 | 95.2 | 1.89 | 1.58 |
| S71 | 116.5 | 113.7 | 154.2 | 97.4 | 47.0 | 40.5 | 40.2 | 262.0 | 163.2 | 86.3 | 1.89 | 1.61 |
| S72 | 119.4 | 115.7 | 154.8 | 97.2 | 46.9 | 39.1 | 40.8 | 284.4 | 176.6 | 92.8 | 1.90 | 1.61 |
| S73 | 118.5 | 114.9 | 154.7 | 101.3 | 48.9 | 39.8 | 40.7 | 272.0 | 173.3 | 95.1 | 1.82 | 1.57 |
| S74 | 118.1 | 114.3 | 155.3 | 100.2 | 48.4 | 41.0 | 41.2 | 287.2 | 176.1 | 87.8 | 2.00 | 1.63 |
| S75 | 119.3 | 114.8 | 154.8 | 101.1 | 48.8 | 40.0 | 40.8 | 255.1 | 157.6 | 79.3 | 1.99 | 1.62 |
| S76 | 117.9 | 114.3 | 154.6 | 97.9 | 47.3 | 40.3 | 40.6 | 230.0 | 144.3 | 78.7 | 1.83 | 1.59 |
| S77 | 119.5 | 115.5 | 156.0 | 97.7 | 47.2 | 40.5 | 41.9 | 296.5 | 182.3 | 92.5 | 1.97 | 1.63 |
| S78 | 116.7 | 113.9 | 154.1 | 98.8 | 47.7 | 40.2 | 40.1 | 248.1 | 154.7 | 83.0 | 1.86 | 1.60 |
| S79 | 119.4 | 116.6 | 151.6 | 103.3 | 49.9 | 35.0 | 37.9 | 91.8 | 57.3 | 28.6 | 2.00 | 1.60 |
| S80 | 118.5 | 115.2 | 151.1 | 100.4 | 48.5 | 36.0 | 37.4 | 92.6 | 58.5 | 28.9 | 2.02 | 1.58 |
| S81 | 119.6 | 115.9 | 151.3 | 104.9 | 50.6 | 35.4 | 37.6 | 97.9 | 59.3 | 28.1 | 2.11 | 1.65 |
| S82 | 119.3 | 116.1 | 152.2 | 108.0 | 52.1 | 36.1 | 38.4 | 100.7 | 62.3 | 28.8 | 2.17 | 1.62 |
| S83 | 119.0 | 115.7 | 152.9 | 106.5 | 51.4 | 37.2 | 39.0 | 115.4 | 70.2 | 32.8 | 2.14 | 1.65 |
| S84 | 117.6 | 115.1 | 151.6 | 105.4 | 50.9 | 36.5 | 37.9 | 92.6 | 58.5 | 30.6 | 1.91 | 1.58 |
| S85 | 117.8 | 114.3 | 152.0 | 94.7 | 45.7 | 37.7 | 38.2 | 576.6 | 359.7 | 166.3 | 2.16 | 1.60 |
| S86 | 116.6 | 111.1 | 149.3 | 99.0 | 47.8 | 38.2 | 35.8 | 392.2 | 246.0 | 116.4 | 2.11 | 1.59 |
| S87 | 115.5 | 111.9 | 148.8 | 85.4 | 41.2 | 36.9 | 35.3 | 306.7 | 192.8 | 93.8 | 2.06 | 1.59 |

Supercooling Limit (SCL) given by SCL = 0.907x – 99.64, where x is Tmp.
In the above examples S47 to S87, branching index (g')values ranged between 0.874 to 1.074.

Solution Polymerization (Comparative Examples):

All the solution polymerizations were performed in a liquid filled, single-stage continuous stirred tank reactor (CSTR). The reactor was a 0.5-liter stainless steel autoclave and was equipped with a stirrer, a water cooling/steam heating element with a temperature controller, and a pressure controller. Solvents and propylene were first purified by passing through a three-column purification system. The purification system consisted of an Oxiclear column (Model # RGP-R1-500 from Labelear) followed by a 5A and a 3A molecular sieve column. Purification columns were regenerated periodically whenever there was evidence of lower activity of polymerization. The purified solvents and monomers were then chilled to about −15 C by passing through a chiller before fed into the reactor through a manifold. Solvent and monomers were mixed in the manifold and fed into reactor through a single tube. All liquid flow rates were measured using Brooksfield mass flow meters or Micro-Motion Coriolis-type flow meters.

The metallocene catalyst precursors shown in Table 3 were pre-activated at a precursor/activator molar ratio of about 1:1 in toluene. All catalyst solutions were kept in an inert atmosphere with <1.5 ppm water content and fed into the reactor by a metering pump through a separate line. Contact between catalyst and monomer took place in the reactor.

As an impurity scavenger, 250 mL of tri-n-octyl aluminum (TNOAl) (25 wt % in hexane, Sigma Aldrich) was diluted in 22.83 kg of hexane. The TNOAl solution was stored in a 37.9-liter cylinder under nitrogen blanket. The solution was used for all polymerization runs until about 90% of consumption, then a new batch was prepared. Pumping rates of the TNOAl solution varied from run to run, typically ranging from 0 (no scavenger) to 4 mL/min.

The reactor was first cleaned by nitrogen purge and solvent wash. After cleaning, the reactor was heated/cooled to the desired temperature using water/steam mixture flowing through the reactor jacket and controlled at a set pressure with controlled solvent flow. Monomers, catalyst solutions and scavenger solution were then fed into the reactor. An automatic temperature control system was used to control and maintain the reactor at a set temperature. Onset of polymerization activity was determined by observations of a viscous product and lower temperature of water-steam mixture. Once the activity was established and system reached steady-state, the reactor was lined out by continuing operating the system under the established condition for a time period of at least five times of mean residence time prior to sample collection. The resulting mixture, containing mostly solvent, polymer and unreacted monomer, was collected in a collection box after the system reached a steady-state operation. The collected samples were first air-dried in a hood to evaporate most of the solvent, and then dried in a vacuum oven at a temperature of about 90C. for about 12 hours. The vacuum-dried samples were weighed to obtain yields. All reactions were carried out at a pressure of about 2.41 MPa gauge.

TABLE 3

Catalyst systems used for generating Comparative Polypropylenes from Solution Polymerization SO1, SO2, SO3, SO4, and SO5, are Catalyst 1 and Activator B. SO6 and SO7 are Catalyst 1 and Activator B2. SO8, SO9,

TABLE 3-continued

Catalyst systems used for generating Comparative
Polypropylenes from Solution Polymerization SO10, SO11 and SO12 are Catalsyt 1 and Activator C. SO13,
SO14 and SO15 are Catalyst 3 and Activator B1. SO16, SO17,
and SO18 are Catlayst 3 and Activator C. SO19, SO20, SO21,
and SO22 are Catalyst 4 and Activator C.

Notes:
Catalysts: 1 = (rac-dimethylsilyl)bis(2-methyl-4-phenylindenyl)zirconium dimethyl, 3 = (rac-dimethylsilyl)bis(2-methyl-4-naphthylindenyl)zirconium dimethyl, and 4 = (rac-dimethylsilyl)bis(2-methyl-4-(3',5'-di-tert-butylphenyl)indenyl)zirconium dimethyl.
Activators: B1 = dimethylaniliniumtertrakis(pentafluorophenyl)borate, B2 = trityltertrakis (pentafluorophenyl)borate, and C = dimethylaniliniumtertrakis(heptafluoronaphthyl)borate.

Table 4 below describes the Examples for comparative solution-polymerized propylene homopolymers, against which the disclosed novel propylene homopolymers were compared.

TABLE 4

Solution-polymerization conditions and product properties

| Example | Reactor Temp (° C.) | Cat feed rate (mol/min) | GPC (DRI) Mw (kg/mol) | DSC data (second heating) | | | |
|---|---|---|---|---|---|---|---|
| | | | | Tmp (° C.) | Tcp (° C.) | Tmp – Tcp (° C.) | SCL (° C.) |
| SO1 | 110 | 2.83E−07 | 29.4 | 139.5 | 105.4 | 34.1 | 26.9 |
| SO2 | 105 | 2.13E−07 | 36.6 | 141.0 | 106.9 | 34.1 | 28.2 |
| SO3 | 100 | 2.13E−07 | 47.5 | 144.1 | 104.9 | 39.2 | 31.0 |
| SO4 | 95 | 2.13E−07 | 57.0 | 146.1 | 109.2 | 36.9 | 32.9 |
| SO5 | 90 | 2.13E−07 | 71.9 | 148.3 | 110.2 | 38.1 | 34.9 |
| SO6 | 90 | 2.83E−07 | 59.6 | 144.8 | 108.0 | 36.8 | 31.6 |
| SO7 | 80 | 2.83E−07 | 91.7 | 149.9 | 109.7 | 40.2 | 36.3 |
| SO8 | 120 | 2.83E−07 | 35.2 | 136.2 | 100.8 | 35.4 | 23.9 |
| SO9 | 110 | 2.83E−07 | 60.0 | 141.5 | 108.1 | 33.4 | 28.7 |
| SO10 | 100 | 2.83E−07 | 96.3 | 146.4 | 110.4 | 36.0 | 33.1 |
| SO11 | 90 | 2.3E−07 | 158.0 | 151.0 | 112.0 | 39.0 | 37.3 |
| SO12 | 80 | 2.83E−07 | ~300 | 151.6 | 112.2 | 39.4 | 37.8 |
| SO13 | 110 | 7.12E−07 | 32.1 | 142.7 | 108.5 | 34.2 | 29.8 |
| SO14 | 100 | 1.68E−07 | 56.8 | 151.6 | 111.1 | 40.5 | 37.9 |
| SO15 | 90 | 5.98E−08 | 60.9 | 155.8 | 109.6 | 46.2 | 41.7 |
| SO16 | 120 | 2.67E−07 | 30.5 | 144.2 | 110.4 | 33.8 | 31.1 |
| SO17 | 110 | 2.24E−08 | 113.6 | 153.4 | 112.6 | 40.8 | 39.5 |
| SO18 | 100 | 2.24E−08 | 156.9 | 151.3 | 112.0 | 39.3 | 37.6 |
| SO19 | 120 | 1.29E−07 | 32.1 | 146.1 | 110.5 | 35.5 | 32.9 |
| SO20 | 110 | 1.29E−07 | 50.4 | 149.5 | 112.4 | 37.1 | 35.9 |
| SO21 | 100 | 1.29E−07 | 81.1 | 153.2 | 114.0 | 39.2 | 39.3 |
| SO22 | 90 | 1.29E−07 | ~108 | 155.7 | 113.8 | 41.9 | 41.6 |

Examples SO1 to SO12: C3 monomer feed 14 g/min, hexane solvent 90 ml/min

Examples SO13 to SO22: C3 monomer feed 14 g/min, hexane solvent 80 ml/min

Supercooling Limit (SCL) given by SCL = 0.907 x − 99.64, where x is Tmp.

Slurry-Polymerized Polypropylenes (Comparative Examples)

Tables 5, 6 and 7 describe prior-art bulk slurry-polymerized propylene homopolymers and their preparation conditions. The technology for manufacturing propylene homopolymers via bulk slurry polymerization is well documented in the literature for both conventional Ziegler-Natta catalysts as well as supported metallocene catalysts.

ACHIEVE™ 1605, 3854 and 6025G1 are commercial homopolymers available from ExxonMobil Chemical Co., Houston, Tex., made in commercial reactors. Slurry Examples SL1 to SL4 are similar to these ACHIEVE products. They were manufactured in similar commercial reactors, but the process conditions were adjusted to reach different MFR and molecular weight (Mw by GPC) values, as shown in Table 6.

TABLE 5

Catalysts used for the production of
Slurry-polymerized Polypropylenes

| Example | Ligand | Activator |
|---|---|---|
| SL1 | 1 | B1 |
| SL2 | 1 | B1 |
| SL3 | 1 | B1 |
| SL4 | 1 | B1 |

TABLE 5-continued

Catalysts used for the production of
Slurry-polymerized Polypropylenes

| Example | Ligand | Activator |
|---|---|---|
| SL5 | 4 | B1 |
| SL6 | 4 | B1 |

Catalysts: 1 = (rac-dimethylsilyl)bis(2-methyl-4-phenylindenyl)zirconium dimethyl, 4 = (rac-dimethylsilyl)bis(2-methyl-4-(3,'5'-di-tert-butylphenyl)indenyl)zirconium dimethyl.
Activator: B1 = dimethylaniliniumtertrakis(pentafluorophenyl)borate.

All catalysts supported on silica; Triethylaluminum (TEAL) used as impurity scavenger.

TABLE 6

Slurry product properties for unmodified reactor granules

| Example | Nominal MFR g/10 min | GPC (DRI) Mw (kg/mol) | DSC data (second heating) | | | |
|---|---|---|---|---|---|---|
| | | | Tmp (° C.) | Tcp (° C.) | Tmp − Tcp (° C.) | SCL (° C.) |
| ACHIEVE 1605 | 30 | 162.1 | 148.4 | 108.1 | 40.3 | 35.0 |
| ACHIEVE 3854 | 23 | N/A | 148.3 | 104.9 | 43.4 | 34.9 |
| ACHIEVE 3854 | 23 | N/A | 148.0 | 106.1 | 41.9 | 34.6 |
| ACHIEVE 6025G1 | 400 | 105.2 | 151.2 | 111.7 | 39.5 | 37.5 |
| SL1 | 150 | 117.3 | 151.4 | 110.6 | 40.8 | 37.7 |
| SL2 | 40 | 162.6 | 151.8 | 110.5 | 41.3 | 38.0 |
| SL3 | 214 | 107.5 | 151.6 | 111.9 | 39.7 | 37.9 |
| SL4 | 240 | 106.3 | 151.8 | 110.2 | 41.6 | 38.0 |
| SL5 | 5 | 239.5 | 157.6 | 115.0 | 42.6 | 43.3 |
| SL6 | 100 | 129.1 | 157.1 | 113.6 | 43.5 | 42.8 |

Supercooling Limit (SCL) derived by SCL = 0.907x − 99.64, where x is Tmp.

Examples SL5 and SL6 were polymerized in a bulk liquid-phase pilot line, involving two continuous, stirred-tank reactors, operated in series. The reactors were equipped with jackets for removing the heat of polymerization. The catalyst, described in Table 5 above, was fed as a 20% solution in mineral oil and flushed into the lead reactor using propylene. Key process settings employed for the polymerization of Examples SL 5 and SL6 are described in Table 7.

TABLE 7

Process Parameters for Polymerization of Examples SL 5 and SL6

| | Example SL5 | Example SL6 |
|---|---|---|
| Catalyst feed rate (g/hr) | 4.9 | 3.4 |
| Scavenger (TEAL) feed rate (ml/min) (2 wt % in hexane) | 4.6 | 4.5 |
| Lead reactor temperature (C.) | 74 | 74 |
| Lead reactor pressure (psig) | 471.6 | 474.6 |
| Lead reactor C3 feed (kg/hr) | 79.5 | 79.6 |
| Lead reactor H2 gas concn (mppm) | 1156 | 2986 |
| Tail reactor temperature (C.) | 68 | 68 |
| Tail reactor pressure (psig) | 421.7 | 421.2 |
| Tail reactor C3 feed (kg/hr) | 29.5 | 29.5 |
| Tail reactor H2 gas concn (mppm) | 1314 | 3613 |
| Lead reactor production rate (kg/hr) | 28.5 | 22.7 |
| Tail reactor production rate (kg/hr) | 10.7 | 11.8 |
| Total production rate (kg/hr) | 39.1 | 34.5 |
| Lead reactor residence time (hr) | 2.56 | 2.85 |
| Tail reactor residence time (hr) | 1.87 | 1.86 |
| Total residence time (hr) | 4.4 | 4.7 |

Polymer was discharged from the reactors as granular product. Key characterization data on the reactor granules of Examples SL5 and SL6 are shown in Table 6.

Regio Defect Concentrations by $^{13}$C NMR

Carbon NMR spectroscopy was used to measure stereo and regio defect concentrations in the polypropylene. Carbon NMR spectra were acquired with a 10-mm broadband probe on a Varian UnityPlus 500 spectrometer. The samples were prepared in 1,1,2,2-tetrachloroethane-d2 (TCE). Sample preparation (polymer dissolution) was performed at 140° C. In order to optimize chemical shift resolution, the samples were prepared without chromium acetylacetonate relaxation agent. Signal-to-noise was enhanced by acquiring the spectra with nuclear Overhauser enhancement for 6 seconds before the acquisition pulse. The 3.2 second acquisition period was followed by an additional delay of 5 seconds, for an aggregate pulse repetition delay of 14 seconds. Free induction decays of 3400-4400 coadded transients were acquired at a temperature of 120° C. After Fourier transformation (256 K points and 0.3 Hz exponential line broadening), the spectrum is referenced by setting the dominant mmmm meso methyl resonance to 21.83 ppm.

Chemical shift assignments for the stereo defects (given as stereo pentads) can be found in the literature [L. Resconi, L. Cavallo, A. Fait, and F. Piemontesi, Chem. Rev. 2000, 100, pages 1253-1345]. The stereo pentads (e.g. mmmm, mmmr, mrrm, etc.) can be summed appropriately to give a stereo triad distribution (m, mr, and rr), and the mole percentage of stereo diads (m and r). Three types of regio defects were quantified: 2,1-erythro, 2,1-threo, and 3,1-isomerization. The structures and peak assignments for these are also given in the reference by Resconi. The concentrations for all defects are quoted in terms of defects per 10,000 monomer units.

The regio defects each give rise to multiple peaks in the carbon NMR spectrum, and these are all integrated and averaged (to the extent that they are resolved from other peaks in the spectrum), to improve the measurement accuracy. The chemical shift offsets of the resolvable resonances used in the analysis are tabulated below. The precise peak positions may shift as a function of NMR solvent choice.

| Regio defect | Chemical shift range (ppm) |
|---|---|
| 2,1-erythro | 42.3, 38.6, 36.0, 35.9, 31.5, 30.6, 17.6, 17.2 |
| 2,1-threo | 43.4, 38.9, 35.6, 34.7, 32.5, 31.2, 15.4, 15.0 |
| 3,1 insertion | 37.6, 30.9, 27.7 |

The average integral for each defect is divided by the integral for one of the main propylene signals (CH3, CH, CH2), and multiplied by 10000 to determine the defect concentration per 10000 monomers.

Differential Scanning Calorimetry for Measuring Crystallization and Melting Temperatures (Tcp and Tmp) and Heat of Fusion (ΔHf):

Peak crystallization temperature (Tcp), Peak melting temperature (Tmp) and heat of fusion (Hf, or ΔHf) were measured using Differential Scanning Calorimetry (DSC) on reactor samples (with no nucleating agent added). This analysis was conducted using either a TA Instruments MDSC 2920 or a Q2000 Tzero DSC. The DSC was calibrated for temperature using four standards (Tin, Indium, cyclohexane, and water). Heat of fusion of Indium (28.46 J/g) was used to calibrate the heat flow signal. The reproducibility of peak melting temperature for polypropylene is within ±0.3° C. and heat of fusion is within 2%. Typically about 3 to 5 mg of polymer from the reactor was sealed in a standard aluminum pan with flat lids and loaded into the instrument at room temperature. Sample was cooled to −70° C. and heated at 10° C./min to 210° C. to acquire the melting data (first heat). This first heating provides the melting behavior for samples made in the reactor. Since thermal history influences melting and crystallization behavior, the sample was held for 5 minutes at 210° C. to destroy its thermal history. This was followed by cooling this sample to −70° C. at a cooling rate of 10° C./min to analyze its crystallization behavior at this cooling rate. The exothermic peak of crystallization was analyzed using the software provided by the vendor and the peak of crystallization (Tcp) is reported. The sample was held at this low temperature of −70° C. for about 10 minutes to equilibrate it and then heated back to 210° C. at 10° C./min to analyze the melting behavior (second heat). This gave the melting behavior of samples crystallized under controlled cooling conditions (10° C./min). The melting temperature reported is obtained by the analysis of the melting peak using the software provided by the vendor and corresponds to the peak of the melting transition (Tmp). All samples reported in this work showed relatively narrow, single melting peaks and the breadth of melting did not show any significant change for different catalysts. Area under the melting curve was used to determine the heat of fusion (ΔHf) in J/g using the software provided by the vendor. This heat of fusion is used to calculate the degree of crystallinity. The percent crystallinity is calculated using the formula: percent crystallinity=[area under the curve (J/g)/207.14 (J/g)]×100%. A value of 207.14 J/g or 8700 J/mol is the equilibrium heat of fusion for 100% crystalline polypropylene and is obtained from Ref: B. Wunderlich in "Thermal Analysis" Academic Press, page 418, 1990.

Melt-Flow Rate Measurements:

The Melt-Flow Rates (MFR) of polymers were determined by using Dynisco Kayeness Polymer Test Systems Series 4003 apparatus following the method described in the Series 4000 Melt Indexer Operation manual, Method B. The method follows ASTM D-1238, Condition L, 2.16 kg and 230° C. All samples were stabilized by using Irganox 1010.

Molecular Weights (Mw, Mn and Mz) by Gel-Permeation Chromatography (GPC):

Molecular weight distributions were characterized using Gel-Permeation Chromatography (GPC), also referred to as Size-Exclusion Chromatography (SEC). Molecular weight (weight average molecular weight, Mw, number average molecular weight Mn, Viscosity average molecular weight, Mv, and Z average molecular weight, Mz) were determined using High-Temperature Gel-Permeation Chromatography equipped with a differential refractive index detector (DRI) to measure polymer concentrations (either from Waters Corporation with on-line Wyatt DAWN "EOS" and Waters GPCV viscometer detectors, or Polymer Laboratories with on-line Wyatt mini-DAWN and Viscotek Corporation viscometer detectors. Experimental details on the measurement procedure are described in the literature by T. Sun, P. Brant, R. R. Chance, and W. W. Graessley, Macromolecules, Volume 34, Number 19, 6812-6820, (2001).

The analysis was performed using a Waters GPCV 2000 (Gel Permeation Chromatograph) with triple detection. The three detectors were in series with Wyatt DAWN "EOS" MALLS 18 angle laser light scattering detector first, followed by the DRI (Differential Refractive Index) then Differential Viscometer detector. The detector output signals are collected on Wyatt's ASTRA software and analyzed using a GPC analysis program. The detailed GPC conditions are listed in Table 8 below.

Standards and samples were prepared in inhibited TCB (1,2,4-trichlorobenzene) solvent. Four NBS polyethylene standards were used for calibrating the GPC. Standard identifications are listed in the table below. The samples were accurately weighed and diluted to a ~1.5 mg/mL concentration and recorded. The standards and samples were placed on a PL Labs 260 Heater/Shaker at 160° C. for two hours. These were filtered through a 0.45 micron steel filter cup then analyzed.

The concentration, c, at each point in the chromatogram is calculated from the baseline-subtracted DRI signal, IDRI, using the following equation:

$$c = K_{DRI}\, I_{DRI}/(dn/dc)$$

where KDRI is a constant determined by calibrating the DRI, and (dn/dc) is the same as described below for the LS analysis. Units on parameters throughout this description of the SEC method are such that concentration is expressed in g/cm3, molecular weight is expressed in g/mole, and intrinsic viscosity is expressed in dL/g.

For the light-scattering detector used at high temperature, the polymer molecular weight, M, at each point in the chromatogram is determined by analyzing the LS output using the Zimm model for static light scattering (M. B. Huglin, Light Scattering from Polymer Solutions, Academic Press, 1971):

$$\frac{K_o c}{\Delta R(\theta)} = \frac{1}{MP(\theta)} + 2A_c c$$

Here, $\Delta R(\theta)$ is the measured excess Rayleigh scattering intensity at scattering angle $\theta$, c is the polymer concentration determined from the DRI analysis, A2 is the second virial coefficient, $P(\theta)$ is the form factor for a monodisperse random coil (described in the above reference), and Ko is the optical constant for the system:

$$K_o = \frac{4\pi^2 n^2 (dn/dc)^2}{\lambda^4 N_A}$$

in which NA is Avogadro's number, and (dn/dc) is the refractive index increment for the system. The refractive index, n=1.500 for TCB at 135° C. and λ=690 nm. In addition, A2=0.0006 for propylene polymers and 0.0015 for butene polymers, and (dn/dc)=0.104 for propylene polymers and 0.098 for butene polymers.

A high temperature Viscotek Corporation viscometer was used, which has four capillaries arranged in a Wheatstone bridge configuration with two pressure transducers. One transducer measures the total pressure drop across the detector, and the other, positioned between the two sides of the bridge, measures a differential pressure. The specific viscosity, ηs, for the solution flowing through the viscometer is calculated from their outputs. The intrinsic viscosity, [η] i, at each point in the chromatogram is calculated from the following equation:

$$[\eta]_i = \eta_{si}/C_i$$

where the concentration, Ci, was determined from the DRI output.

The branching index (g') is calculated using the output of the SEC-DRI-LS-VIS method as follows. The branching index g' is defined as: Sample measured [η]/calculated theoretical [η] of a linear polymer, where the calculated theoretical [η] of a linear=k Mα where k=0.0002288 and α=0.705 for propylene polymers.

Mv is the viscosity average molecular weight based on molecular weights determined by light-scattering (LS) analysis. The viscosity average molecular weight, Mv, of the sample is calculated by:

$$Mv = \{\Sigma hiMi\alpha/\Sigma hi\}1/\alpha$$

Mi=molecular weight for each time slice, hi, from the chromatogram, and the summations are carried out over all chromotographic slices, i.e., between the integration limits.

TABLE 8

| Gel Permeation Chromatography (GPC) measurement conditions | | |
|---|---|---|
| INSTRUMENT | | WATERS 2000 V + Wyatt Dawn EOS |
| COLUMN | Type: | 3 x MIXED BED TYPE "B" |
| | | 10 MICRON PD (high porosity col.'s) |
| | Length: | 300 mm |
| | ID: | 7.8 mm |
| | Supplier | POLYMER LABS |
| SOLVENT PROGRAM | A | 0.54 ml/min TCB inhibited |
| | | GPC console setting was 0.5 mL/min to which 8% expansion factor (from Waters) makes actual flow 0.54 mL/min |
| DETECTOR | A: | Wyatt MALLS 17 angle's of laser light scattering detector |
| | B: | DIFFERENTIAL REFRACTIVE INDEX (DRI) in series |
| | C: | Viscometer |
| | | IDvol. = +232.2 ul LS to DRI |
| | | IDvol. = −91.8 ul Dp to DRI |
| TEMPERATURE | Injector: | 135° C. |
| | Detector: | 135° C. |
| | Column: | 135° C. |
| DISOLUTION CONDITIONS | | Shaken for 2 h on a PL SP260 heater |
| | | Shaker @160° C. |
| SAMPLE FILTRATION | | Through a 0.45μ SS Filter @ 135° C. |
| INJECTION VOLUME | | 329.5 μL |
| SAMPLE CONCENTRATION | | 0.15 w/v % (1.5 mg/ml) Target wt |
| SOLVENT DILUENT | | TCB inhibited |
| CALIBRATION NARROW PE STANDARDS | | NIST 1482a; NIST1483a; NIST1484a |
| BROAD PE STANDARD | | NIST 1475a |

All patents, test procedures, priority documents, and other documents cited in this application are fully incorporated by reference to the extent such disclosure is not inconsistent with this application and for all jurisdictions in which such incorporation is permitted. While the foregoing is directed to embodiments of the present invention, other and further embodiments of the invention can be devised without departing from the basic scope thereof, and the scope thereof is determined by the claims that follow.

What is claimed is:

1. An isotactic propylene homopolymer having:
   more than 15 and less than 100 regio defects (sum of 2,1-erythro and 2,1-threo insertions and 3,1-isomerizations) per 10,000 propylene units;
   an Mw (weight average molecular weight) of 35,000 g/mol or more;
   a peak melting temperature of greater than 149° C.;
   an mmmm pentad fraction of 0.85 or more;
   a heat of fusion of 80 J/g or more; and
   a Tmp−Tcp≦(0.907×Tmp)−99.64, as measured in ° C. on the homopolymer having 0 wt % nucleating agent, wherein Tmp is the peak melting temperature and Tcp is the peak crystallization temperature.

2. The homopolymer of claim 1 wherein the polymer has an Mw/Mn ratio of greater than 1 to less than 5.

3. The homopolymer of claim 1 wherein the polymer has an inorganic catalyst residue of 100 weight ppm or less, the inorganic catalyst residue comprising Group 4, Group 6, and Group 8 transition metals, boron, aluminum, and silicon.

4. The homopolymer of claim 1, where the peak melting temperature (Tmp) is from about 150° C. to about 170° C.

5. The homopolymer of claim 1, wherein the homopolymer has a branching index (g') of between 0.85 to 1.10.

6. The homopolymer of claim 1, wherein the peak melting temperature minus peak crystallization temperature (Tmp−Tcp) is less than or equal to (0.907 times Tmp) minus 100.14, (measured in ° C. on the homopolymer having 0 wt % nucleating agent).

7. The homopolymer of claim 1, wherein the peak melting temperature minus peak crystallization temperature (Tmp−Tcp) is less than or equal to (0.907 times Tmp) minus 100.64, (measured in ° C. on the homopolymer having 0 wt % nucleating agent).

8. The homopolymer of claim 1, wherein the homopolymer has an mmmm pentad fraction of 0.98 or greater.

9. The homopolymer of claim 1 wherein the homopolymer has a heat of fusion of 100 J/g or more.

10. The homopolymer of claim 1, wherein the homopolymer has an Mw of 100,000 g/mol or more.

11. The homopolymer of claim 1 wherein the homopolymer has an Mw of 300,000 g/mol or more.

12. The homopolymer of claim 1, where the peak melting temperature (Tmp) is from about 155° C. to about 170° C.

13. The homopolymer of claim 1, wherein the homopolymer has more than 17 and less than 95 defects per 10,000 propylene units.

14. The homopolymer of claim 1, wherein the homopolymer has an mmmm pentad fraction of 0.95 or greater.

15. An isotactic propylene homopolymer having:
more than 15 and less than 100 regio defects (sum of 2,1-erythro and 2,1-threo insertions, and 3,1-isomerizations) per 10,000 propylene units;
an Mw (weight average molecular weight) of 35,000 g/mol or more;
a peak melting temperature of greater than 149° C.;
an mmmm pentads fraction of 0.85 or more;
a heat of fusion of 80 J/g or more; and
a peak melting temperature minus peak crystallization temperature (Tmp−Tcp) of less than or equal to (0.907 times Tmp) minus 99.64 (Tmp−Tcp≦(0.907×Tmp)−99.64), as measured in ° C. on the homopolymer having 0 wt % nucleating agent,
wherein the homopolymer is produced by polymerization of propylene in a reactor at 65 to 150° C. and 1.72 to 34.5 MPa, in the presence of an activator and a metallocene represented by the formula:

$R_2Q$ bis(2-$R^1$-4-$R^2$-Indenyl)$MX_2$ wherein each R is, independently, hydrogen or a C1 to C20 hydrocarbyl group, Q is Si, $CH_2$ or $CH_2$—$CH_2$, $R^1$ is a C1 to C12 linear, branched or cyclic alkyl group, $R^2$ is phenyl or naphthyl or a substituted phenyl or naphthyl group, M is Hf or Zr and X is a halide or a C1 to C20 hydrocarbyl group, wherein about 35 wt % to about 80 wt % propylene monomer, and about 20 wt % to about 65 wt % solvent, based on total weight of propylene monomer and solvent, is fed into the polymerization reactor, and the polymerization occurs at a temperature above the solid-fluid phase transition temperature of the polymerization system and above a pressure greater than 1 MPa below the cloud point pressure of the polymerization system, provided however that the polymerization occurs: (1) at a temperature below the critical temperature of the polymerization system, or (2) at a pressure below the critical pressure of the polymerization system.

16. The homopolymer of claim 15, wherein Mw is 200,000 g/mol or greater, the mmmm pentad fraction is 0.98 or greater, the peak melting temperature (Tmp) is 150° C. to 170° C., the heat of fusion is 95 J/g or greater and wherein the metallocene is selected from the group consisting of: dimethylsilyl bis(2-methyl-4-phenylindenyl)zirconium dihalide or dimethylsilyl bis(2-methyl-4-phenylindenyl)zirconium dialkyl, dimethylsilyl bis(2-isopropyl-4-naphthylindenyl)zirconium dichloride or dimethylsilyl bis(2-isopropyl-4-naphthylindenyl)zirconium dialkyl, dimethylsilyl bis(2-methyl-4-naphthylindenyl)zirconium dichloride or dimethylsilyl bis(2-methyl-4-naphthylindenyl)zirconium dialkyl, dimethylsilyl bis(2-methyl-4-(3'5'-di-t-butyl)phenylindenyl)zirconium dichloride or dimethylsilyl bis(2-methyl-4-(3'5'-di-t-butyl)phenylindenyl)zirconium dialkyl, or mixtures thereof, and the activator is selected from the group consisting of alumoxane, trimethylammoniumtetrakis(pentafluorophenyl)borate, N,N-dimethylaniliniumtetrakis(pentafluorophenyl)borate, triphenylcarbeniumtetrakis(perfluorophenyl)borate, N,N-dimethylaniliniumtetrakis(perfluoronaphthyl)borate, N,N-dimethylaniliniumtetrakis(perfluorophenyl)borate, and mixtures thereof.

17. The homopolymer of claim 15, wherein the residence time is about 3 minutes to about 30 minutes.

18. An isotactic propylene homopolymer having:
more than 15 and less than 100 regio defects (sum of 2,1-erythro and 2,1-threo insertions, and 3,1-isomerizations) per 10,000 propylene units;
an Mw (weight average molecular weight) of 35,000 g/mol or more;
a peak melting temperature of greater than 149° C.;
an mmmm pentads fraction of 0.85 or more;
a heat of fusion of 80 J/g or more; and
a peak melting temperature minus peak crystallization temperature (Tmp−Tcp) of less than or equal to (0.907 times Tmp) minus 99.64 (Tmp−Tcp≦(0.907×Tmp)−99.64), as measured in ° C. on the homopolymer having 0 wt % nucleating agent,
wherein the homopolymer is produced by polymerization of propylene in a reactor at 93 to 150° C. and 34 to 240 MPa, where the temperature is above the cloud point temperature and above the supercritical temperature of the polymerization system, and in the presence of an activator and a metallocene represented by the formula:

$R_2Q$ bis(2-$R^1$-4-$R^2$-Indenyl)$MX_2$ wherein each R is, independently, hydrogen or a C1 to C20 hydrocarbyl group, Q is Si, $CH_2$ or $CH_2$—$CH_2$, $R^1$ is a C1 to C12 linear, branched or cyclic alkyl group, $R^2$ is phenyl or naphthyl or a substituted phenyl or naphthyl group, M is Hf or Zr and X is a halide or a C1 to C20 hydrocarbyl group.

19. The homopolymer of claim 18, wherein Mw is 200,000 g/mol or greater, the mmmm pentad fraction is 0.98 or greater, the peak melting temperature (Tmp) is 150° C. to 170° C., the heat of fusion is 95 J/g or greater.

20. The homopolymer of claim 18, wherein the metallocene is selected from the group consisting of: dimethylsilyl bis(2-methyl-4-phenylindenyl)zirconium dihalide or dimethylsilyl bis(2-methyl-4-phenylindenyl)zirconium dialkyl, dimethylsilyl bis(2-isopropyl-4-naphthylindenyl)zirconium dichloride or dimethylsilyl bis(2-isopropyl-4-naphthylindenyl)zirconium dialkyl, dimethylsilyl bis(2-methyl-4-naphthylindenyl) Zirconium dichloride or dimethylsilyl bis(2-methyl-4-naphthylindenyl)zirconium dialkyl, dimethylsilyl bis(2-methyl-4-(3'5'-di-t-butyl)phenylindenyl)zirconium dichloride or dimethylsilyl bis(2-methyl-4-(3'5'-di-t-butyl)phenylindenyl)zirconium dialkyl, or mixtures thereof.

21. The homopolymer of claim 18, wherein about 40 wt % to about 80 wt % propylene monomer, and about 20 wt % to about 60 wt % solvent, based on total weight of propylene monomer and solvent, is fed into the polymerization reactor.

22. The homopolymer of claim 18, wherein the catalyst productivity is about 100,000 g polymer per g of metallocene or more.

23. The homopolymer of claim 18, wherein the residence time is about 3 minutes to about 30 minutes.

24. The homopolymer of claim 18, wherein the activator is selected from the group consisting of alumoxane, trimethylammoniumtetrakis(pentafluorophenyl)borate, N,N- dimethylaniliniumtetrakis(pentafluorophenyl)borate, triphenylcarbeniumtetrakis(perfluorophenyl)borate, N,N-dimethylaniliniumtetrakis(perfluoronaphthyl)borate, N,N-dimethylaniliniumtetrakis(perfluorophenyl)borate, and mixtures thereof.

25. An article made from the homopolymer of claim 1.

* * * * *